United States Patent
Nakamura et al.

(10) Patent No.: US 11,000,035 B2
(45) Date of Patent: May 11, 2021

(54) SOIL-BORNE DISEASE CONTROL METHOD, SOIL FOR PLANT CULTIVATION USE, AND SOIL-BORNE DISEASE CONTROL AGENT

(71) Applicants: NATIONAL RESEARCH AND DEVELOPMENT AGENCY NATIONAL AGRICULTURE AND FOOD RESEARCH ORGANIZATION, Tsukuba (JP); KANEKA CORPORATION, Osaka (JP)

(72) Inventors: Hitoshi Nakamura, Tsukuba (JP); Koichi Suzaki, Higashihiroshima (JP); Takahiko Sugaya, Settsu (JP); Shingo Kobayashi, Takasago (JP)

(73) Assignees: NATIONAL RESEARCH AND DEVELOPMENT AGENCY NATIONAL AGRICULTURE AND FOOD RESEARCH ORGANIZATION, Tsukuba (JP); KANEKA CORPORATION, Osaka (JP)

( * ) Notice: Subject to any disclaimer, the term of this patent is extended or adjusted under 35 U.S.C. 154(b) by 732 days.

(21) Appl. No.: 15/658,799

(22) Filed: Jul. 25, 2017

(65) Prior Publication Data
US 2017/0347648 A1  Dec. 7, 2017

Related U.S. Application Data

(63) Continuation of application No. PCT/JP2016/000327, filed on Jan. 22, 2016.

(30) Foreign Application Priority Data

Jan. 26, 2015 (JP) .............................. JP2015-012357

(51) Int. Cl.
| | |
|---|---|
| *A01N 37/36* | (2006.01) |
| *A01M 17/00* | (2006.01) |
| *A01N 25/02* | (2006.01) |
| *A01N 25/12* | (2006.01) |
| *A01N 61/00* | (2006.01) |

(52) U.S. Cl.
CPC .............. *A01N 37/36* (2013.01); *A01M 17/00* (2013.01); *A01N 25/02* (2013.01); *A01N 25/12* (2013.01); *A01N 61/00* (2013.01)

(58) Field of Classification Search
CPC ....................................................... A01N 37/36
See application file for complete search history.

(56) References Cited

FOREIGN PATENT DOCUMENTS

| CN | 101928179 A | * | 6/2009 |
|---|---|---|---|
| JP | 9-175917 A | | 7/1997 |
| JP | 9-194311 A | | 7/1997 |
| JP | 10-36211 A | | 2/1998 |
| JP | 2002275009 A | * | 3/2001 |
| JP | 3213112 B2 | | 10/2001 |
| JP | 2002-104907 A | | 4/2002 |
| JP | 2003-26493 A | | 1/2003 |
| JP | 2003-26506 A | | 1/2003 |
| JP | 2005-206496 A | | 8/2005 |
| JP | 2005-263733 A | | 9/2005 |
| JP | 2006-199601 A | | 8/2006 |
| JP | 2009-292741 A | | 12/2009 |
| JP | 4936444 B2 | | 5/2012 |
| JP | 2014-111557 A | | 6/2014 |
| WO | WO2005085460 A1 | * | 9/2005 |

OTHER PUBLICATIONS

Doi et al. Biodegradtion of Biosynthetic and Chemosynthetic Polhydroxyalkanoates. (Year: 1994).*
A. N. Boyandin. et al, "Biodegradation of Polyhydroxyalkanoates by Soil Microbial Communities of Different Structures and Detection of PHA Degrading Microorganisms" Applied Biochemistry and Microbiology, vol. 48, No. 1. XP002783154, 2012. pp. 28-36.
International Search Report dated Apr. 12, 2016 in PCT/JP2016/000327 filed Jan. 22, 2016.
Gamal R. Saad, et al., "Preparation, Characterization and Antimicrobial Activity of Poly(3-hydroxybutyrate-co-3-hydroxyvalerate)-g-Poly(N-vinylpyrrolidone) Copolymers" Polymer-Plastics Technology and Engineering, 2012, vol. 51, 10 Pages.
Hiroshi Haneda, et al., "Effect of Organic Materials Application to the Soil on Root-Infecting Fungi" Annual Report of the Society of Plant Protection of North Japan, No. 36, 1985, pp. 157-159.

* cited by examiner

*Primary Examiner* — Sarah Alawadi
(74) *Attorney, Agent, or Firm* — Oblon, McClelland, Maier & Neustadt, L.L.P.

(57) ABSTRACT

Disclosed herein is a soil-borne disease control method capable of simply suppressing a soil-borne pathogen. The method for controlling a soil-borne disease includes applying at least one polyhydroxyalkanoic acid having a structure represented by the following formula (1) to soil:

[—CHR—CH$_2$—CO—O—]  (1)

(wherein R is an alkyl group represented by $C_nH_{2n+1}$ and n is an integer of 1 or more but 15 or less).

18 Claims, 13 Drawing Sheets
(9 of 13 Drawing Sheet(s) Filed in Color)

FIG. 1A
FIG. 1B
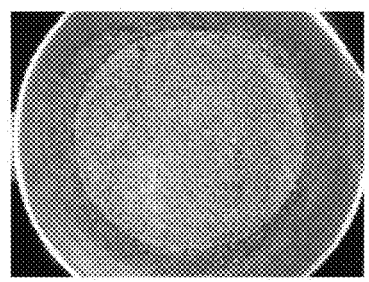
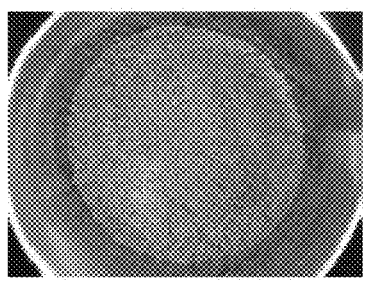
FIG. 2A
FIG. 2B
SURFACE
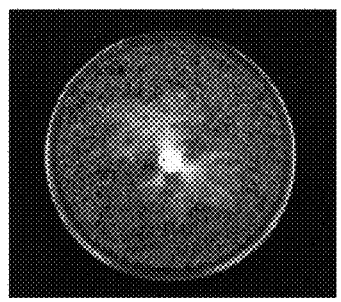
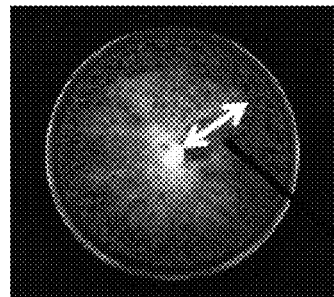
BOTTOM
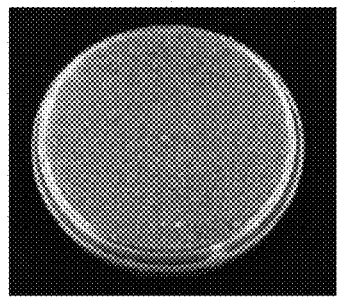
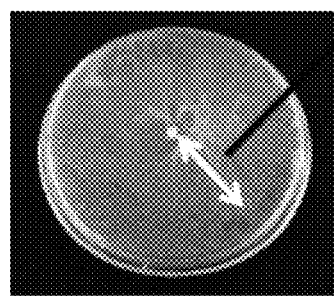
DEGREE OF GROWTH FIG. 3
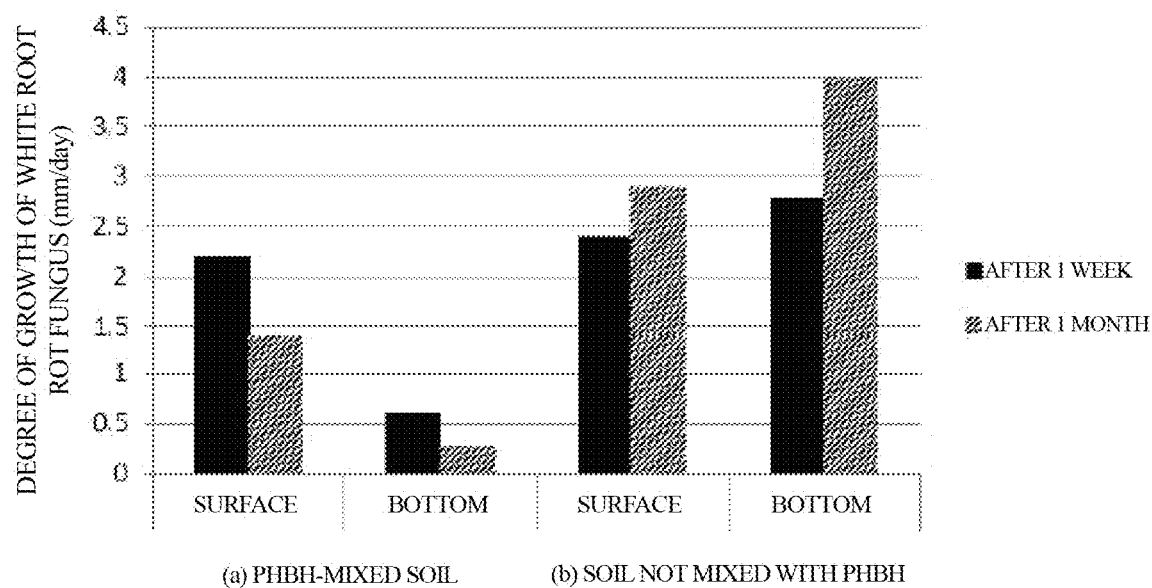
FIG. 4A
FIG. 4B
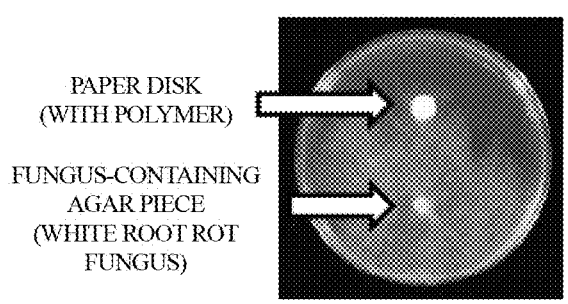
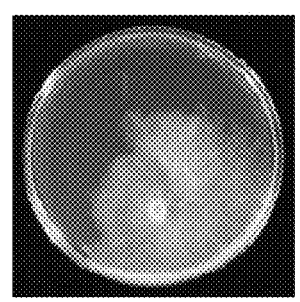

FIG. 12A   FARM SOIL COLLECTED FROM GRAPE
           FIELD IN NAGANO PREFECTURE
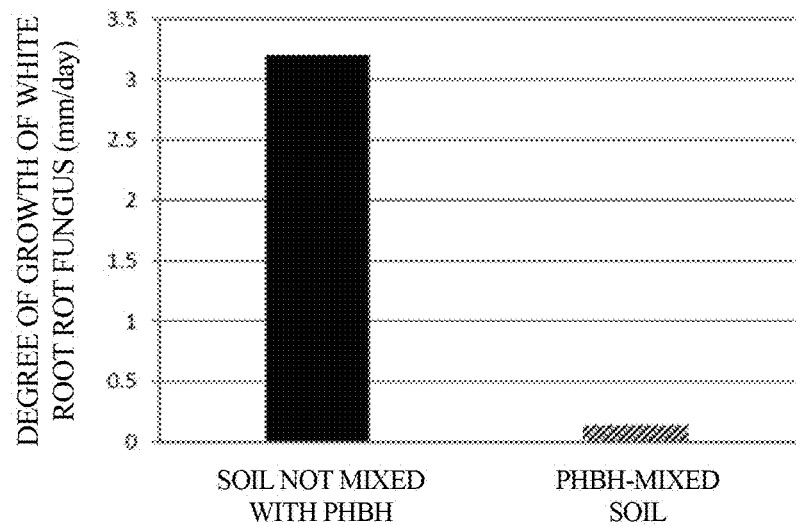
FIG. 12B   COMMERCIALLY-AVAILABLE BLACK SOIL
           (PRODUCED IN TOCHIGI PREFECTURE)
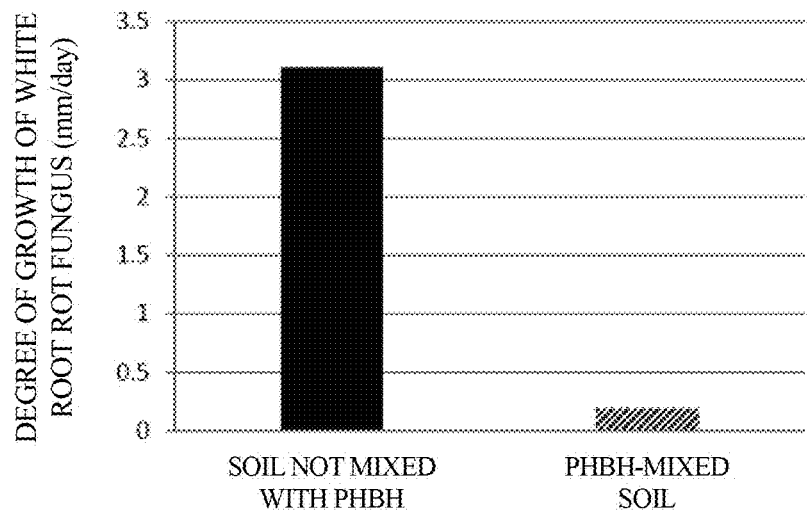

ROTTEN ROOT (AFTER 2 MONTHS FROM INOCULATION)

SOIL NOT MIXED WITH PHBH

ENTIRELY DISEASED (SEVERITY: 90%)

PHBH-MIXED SOIL

PARTIALLY DISEASED (ONLY IN AREA MARKED WITH ARROW)
(SEVERITY: 20%)

ROTTEN ROOTSTOCK

SOIL NOT MIXED WITH PHBH

PHBH-MIXED SOIL

ROTTEN YOUNG FRUIT OF JAPANESE PEAR (AFTER 1 WEEK FROM INOCULATION)

SOIL NOT MIXED WITH PHBH

PROLIFERATED EPIPHYTOTIC PATHOGEN

PHBH-MIXED SOIL

FIG. 22
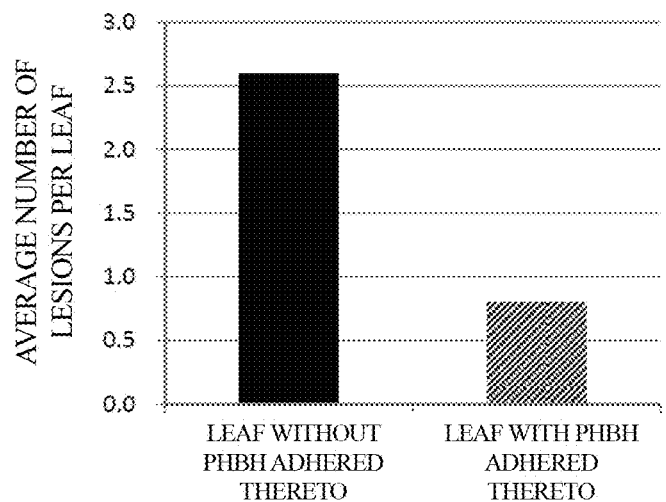
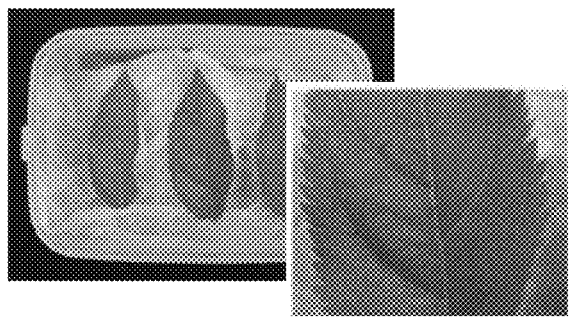
FIG. 23A
LEAF WITHOUT PHBH
ADHERED THERETO
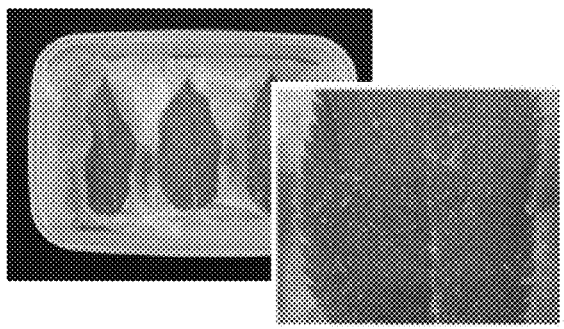
FIG. 23B
LEAF WITH PHBH
ADHERED THERETO
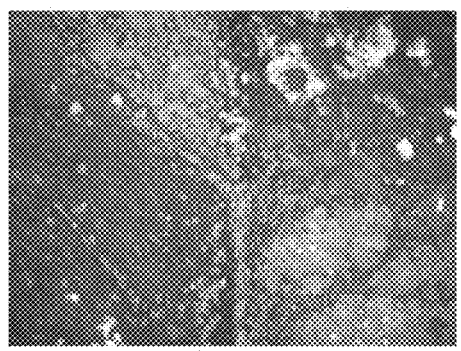

SOIL NOT MIXED WITH PHBH

AVERAGE MAXIMUM DIAMETER OF
GALLS FORMED PER STICK: 2.8 cm

PHBH-MIXED SOIL

AVERAGE MAXIMUM DIAMETER OF
GALLS FORMED PER STICK: 1.3 cm

SOIL-BORNE DISEASE CONTROL METHOD, SOIL FOR PLANT CULTIVATION USE, AND SOIL-BORNE DISEASE CONTROL AGENT

TECHNICAL FIELD

The present invention relates to a soil-borne disease control method, soil for plant cultivation, and a soil-borne disease control agent.

BACKGROUND ART

Soil-borne diseases caused by soil-inhabiting filamentous fungi are important diseases that cause heavy damage to fruit trees and vegetables, and therefore there has been demand from production sites for the development of an effective control method. Currently, soil-borne diseases are mainly controlled by chemical agents, and therefore the development of an environmentally-friendly control technique is urgently necessary.

One method for controlling white root rot that is one of soil-borne diseases is to add a microorganism antagonistic to a white root rot fungus to soil. As such microorganisms to be added to soil, PTL 1 discloses Bacillus bacteria, PTL 2, PTL 3, and PTL 4 disclose filamentous fungi such as *Trichoderma* fungi, and PTL 5 discloses a mushroom.

PTL 6 and PTL 7 disclose a white root rot control method in which a compound such as tolclofos-methyl is added to soil, PTL 8 discloses a white root rot control method in which an iodine-containing compound is added to soil, and PTL 9 discloses a white root rot control method in which 3-chloro-N-(3-chloro-5-trifluoromethyl-2-pyridyl)-α,α,α-trifluoro-2,6-dinitro-p-toluidine is added to soil. Seven products using such chemical compounds, such as fluazinam wettable powder (trade name: Frowncide SC) and isoprothiolane granules (trade name: FUJI-ONE granule), have been registered as agricultural chemicals.

Non-PTL 1 reports that when organic waste (e.g., soybean cake, bran, oil cake) is added to soil, the growth of a white root rot fungus is suppressed due to a change in soil microflora.

PTL 10 and PTL 11 disclose the application of a non-pathogenic white root rot fungus to soil.

CITATION LIST

Patent Literature

PTL 1: JP 2005-206496 A
PTL 2: Japanese Patent No. 3213112
PTL 3: JP 2006-199601 A
PTL 4: JP H10-036211 A
PTL 5: JP 2009-292741 A
PTL 6: JP H9-175917 A
PTL 7: JP H9-194311 A
PTL 8: JP 2005-263733 A
PTL 9: JP 2002-104907 A
PTL 10: Japanese Patent No. 4936444
PTL 11: JP 2014-111557 A

Non-Patent Literature

Non-PTL 1: "Effect of Organic Materials Application to the Soil on Root-Infecting Fungi" by Hiroshi Haneda, Iwao Matsuzaki, and Takao Mitsueda, Annual Report of the Society of Plant Protection of North Japan, No. 36 (1985), pp. 157-159 published by The Society of Plant Protection of North Japan

SUMMARY OF INVENTION

Technical Problem

The addition of a microorganism to soil is intended to obtain the effect of suppressing white root rot caused by a white root rot fungus by applying an externally-obtained specific type of microorganism to a target soil, but the presence of microorganisms that normally live in the target soil is not taken into consideration at all. Therefore, there is a case where the establishment of the applied microorganism in the target soil is inhibited by the action of such normal microorganisms so that the effect of suppressing white root rot is quickly lost. Further, the microorganism needs to be cultured and grown. In addition to that, the microorganism is stored in a living state, and therefore has a storage life as short as one year or less even in a cold place.

When a compound such as tolclofos-methyl, an iodine-containing compound, or 3-chloro-N-(3-chloro-5-trifluoromethyl-2-pyridyl)-α,α,α-trifluoro-2,6-dinitro-p-toluidine is added to soil, such a chemical compound or an agent using such a chemical compound and registered as an agricultural chemical directly acts on pathogens, and therefore there is a fear that the environment is affected.

Organic waste is likely to deteriorate during storage, and its production conditions are not constant. Therefore, when organic waste is added to soil, it is difficult to prepare organic waste uniform in quality.

When a non-pathogenic white root rot fungus is applied to soil, it is necessary to culture and grow the non-pathogenic white root rot fungus. However, the non-pathogenic white root rot fungus does not form spores and is therefore difficult to industrially produce. In addition, the non-pathogenic white root rot fungus is stored in a living state and therefore has a short storage life.

As described above, no control method has been found which can simply suppress a soil-borne pathogen.

It is therefore an object of the present invention to provide a soil-borne pathogen control method capable of simply suppressing a soil-borne pathogen.

Solution to Problem

The present inventors have intensively studied to solve the above problems and have completed the present invention.

More specifically, the present invention relates to a method for controlling a soil-borne disease, comprising applying at least one polyhydroxyalkanoic acid having a structure represented by the following formula (1) to soil:

$$[-CHR-CH_2-CO-O-] \qquad (1)$$

(wherein R is an alkyl group represented by $C_nH_{2n+1}$ and n is an integer of 1 or more but 15 or less).

The polyhydroxyalkanoic acid is preferably applied in a volume ratio of 1% or more of a total volume of the polyhydroxyalkanoic acid and the soil.

The application is preferably performed by mixing the at least one polyhydroxyalkanoic acid having a structure represented by the formula (1) and the soil.

The soil-borne disease is preferably a disease caused by a white root rot fungus.

The present invention also relates to a method for controlling a disease, comprising adhering at least one polyhydroxyalkanoic acid having a structure represented by the following formula (1) to at least one part of a plant selected from leaves, branches, a stem/trunk, and fruit:

$$[-CHR-CH_2-CO-O-] \quad (1)$$

(wherein R is an alkyl group represented by $C_nH_{2n+1}$ and n is an integer of 1 or more but 15 or less).

The disease is preferably powdery mildew.

The polyhydroxyalkanoic acid is preferably poly(3-hydroxybutyric acid-co-3-hydroxyhexanoic acid).

The present invention also relates to soil for plant cultivation obtained by mixing at least one polyhydroxyalkanoic acid having a structure represented by the following formula (1) and soil:

$$[-CHR-CH_2-CO-O-] \quad (1)$$

(wherein R is an alkyl group represented by $C_nH_{2n+1}$ and n is an integer of 1 or more but 15 or less).

The soil for plant cultivation is preferably obtained by mixing the polyhydroxyalkanoic acid in a volume ratio of 1% or more of a total volume of the polyhydroxyalkanoic acid and the soil.

The present invention also relates to a soil-borne disease control agent comprising at least one polyhydroxyalkanoic acid having a structure represented by the following formula (1):

$$[-CHR-CH_2-CO-O-] \quad (1)$$

(wherein R is an alkyl group represented by $C_nH_{2n+1}$ and n is an integer of 1 or more but 15 or less).

Advantageous Effects of Invention

According to the present invention, it is possible to simply suppress a soil-borne pathogen.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1A is a photograph showing a mixture of PHBH and soil just after mixing in Experimental Example 1, and FIG. 1B is a photograph showing farm soil collected from a Japanese pear field in NARO Institute of Fruit Tree Science and not mixed with PHBH in Experimental Example 1.

FIG. 2A is a photograph showing the growth of a white root rot fungus in the PHBH-mixed soil (allowed to stand for 1 month) in Experimental Example 1, and FIG. 2B is a photograph showing the growth of a white root rot fungus in the soil not mixed with PHBH in Experimental Example 1.

FIG. 3 is a graph showing the degree of growth of a white root rot fungus in the PHBH-mixed soil (a) in Experimental Example 1 and the degree of growth of a white root rot fungus in the soil not mixed with PHBH (b) in Experimental Example 1.

FIG. 4A is a photograph showing the growth of a white root rot fungus when a paper disk that had been dipped in a polymer suspension was placed on a culture medium in Experimental Example 2, and FIG. 4B is a photograph showing the growth of a white root rot fungus when a paper disk that had been dipped in a polymer suspension was not placed on a culture medium in Experimental Example 2.

FIG. 12A is a graph showing the degree of growth of a white root rot fungus when farm soil collected from a grape field in Nagano Prefecture was used in Experimental Example 8, and FIG. 12B is a graph showing the degree of growth of a white root rot fungus when commercially-available black soil was used in Experimental Example 8.

FIG. 22 is a graph showing the average number of lesions of powdery mildew per apple tree leaf with PHBH and the number of lesions of powdery mildew per apple tree leaf without PHBH in Experimental Example 13.

FIG. 23A and FIG. 23B are photographs showing the degree of powdery mildew in Experimental Example 13.

DESCRIPTION OF EMBODIMENTS

Figure 5:
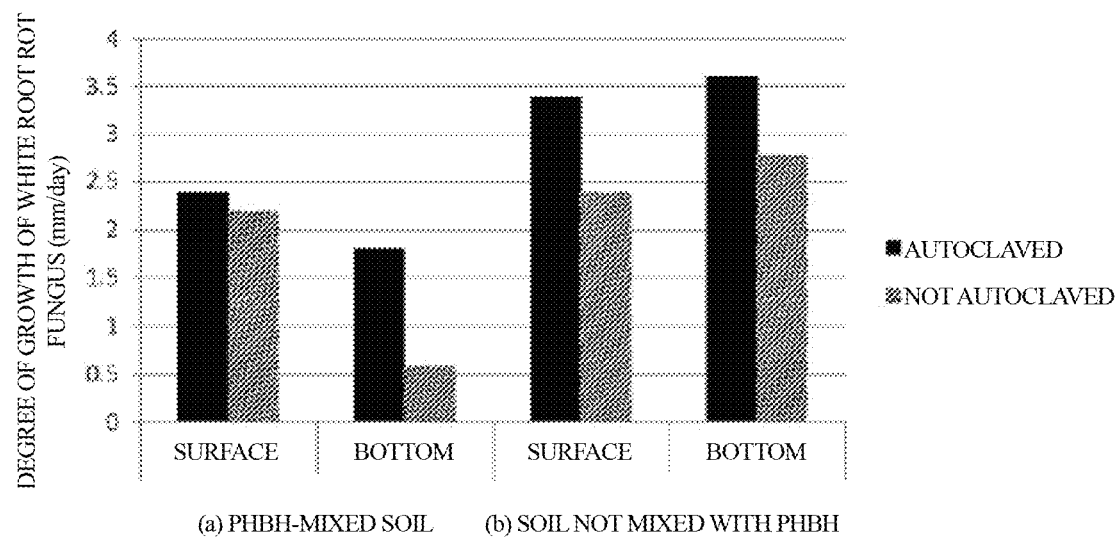
FIG. 5 is a graph showing the degree of growth of a white root rot fungus in PHBH-mixed soil (a) in Experimental Example 3 and the degree of growth of a white root rot fungus in soil not mixed with PHBH (b) in Experimental Example 3.

Hereinbelow, one example of a preferred embodiment of the present invention will be described in detail.

Polyhydroxyalkanoic Acid

In the present invention, a polyhydroxyalkanoic acid is an aliphatic polyester resin having a repeating unit represented by a general formula: [—CHR—CH$_2$—CO—O—].

The polyhydroxyalkanoic acid preferably has a structure represented by a formula (1):

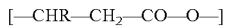

[—CHR—CH$_2$—CO—O—]

(wherein R is an alkyl group represented by C$_n$H$_{2n+1}$ and n is an integer of 1 or more but 15 or less).

At least one polyhydroxyalkanoic acid having a structure represented by the formula (1) is used, and two or more polyhydroxyalkanoic acids may be used in combination.

Specific examples of the polyhydroxyalkanoic acid include poly(3-hydroxybutyric acid), poly(3-hydroxybutyric acid-co-3-hydroxyvaleric acid), poly(3-hydroxybutyric acid-co-3-hydroxyhexanoic acid) (hereinafter, also referred to as PHBH), poly(3-hydroxybutyric acid-co-4-hydroxybutyric acid), poly(3-hydroxybutyric acid-co-3-hydroxyoctanoic acid), and poly(3-hydroxybutyric acid-co-3-hydroxydecanoic acid). Among them, poly(3-hydroxybutyric acid-co-3-hydroxyhexanoic acid) is preferred for its high amorphous phase content, excellent biodegradability, and high polymer productivity. These polyhydroxyalkanoic acids may be used singly or in combination of two or more of them.

The polyhydroxyalkanoic acid having a structure represented by the formula (1) (hereinafter, also referred to as PHA) is preferably a resin having a 3-hydroxybutyric acid content of 60 mol % or more, and is more preferably a resin having a 3-hydroxybutyric acid content of 80 mol % or more. Further, the polyhydroxyalkanoic acid is preferably produced by a microorganism.

If the amount of a comonomer copolymerized with 3-hydroxybutyric acid (hereinafter, also referred to as 3HB), such as 3-hydroxyvaleric acid, 3-hydroxyhexanoic acid (hereinafter, also referred to as 3HH), or 4-hydroxybutyric acid, exceeds 40%, there is a case where the polyhydroxyalkanoic acid is difficult to disperse in soil for its tackiness.

Each monomer content in a copolymer resin as the PHA can be measured by gas chromatography in the following manner. In a vessel, about 20 mg of the dry PHA is mixed with 2 mL of a sulfuric acid/methanol mixed liquid (15/85 (weight ratio)) and 2 mL of chloroform, and the vessel is tightly sealed. Then, the mixture is heated at 100° C. for 140 minutes to obtain a methyl ester of a PHA decomposition product. After cooling, 1.5 g of sodium hydrogen carbonate is added thereto little by little for neutralization, and the mixture is allowed to stand until generation of carbon dioxide gas is stopped. Then, the mixture is well mixed with 4 mL of diisopropyl ether, and the monomer unit composition of the PHA decomposition product in a supernatant is analyzed by capillary gas chromatography to determine each monomer content in the copolymer resin.

The gas chromatography is performed using "GC-17A" manufactured by SHIMADZU CORPORATION as a gas chromatograph and "NEUTRA BOND-1" (column length: 25 m, column inner diameter: 0.25 mm, liquid film thickness: 0.4 µm) manufactured by GL Sciences Inc. as a capillary column. He gas is used as a carrier gas, a column inlet pressure is set to 100 kPa, and the amount of a sample to be injected is 1 µL. As for temperature conditions, the temperature is increased from an initial temperature of 100° C. to 200° C. at a rate of 8° C./min, and is further increased from 200 to 290° C. at a rate of 30° C./min.

The weight-average molecular weight of the PHA is preferably 3000 or more, more preferably 100000 or more, even more preferably 400000 or more. If the weight-average molecular weight is less than 3000, the PHA is difficult to disperse in soil for its tackiness.

The weight-average molecular weight can be measured using a gel permeation chromatography ("Shodex GPC-101" manufactured by Showa Denko K.K.), a polystyrene gel column ("Shodex K-804" manufactured by Showa Denko K.K.), and chloroform as a mobile phase, and can be determined as a molecular weight based on a polystyrene calibration curve. At this time, the calibration curve is prepared using polystyrene standards having weight-average molecular weights of 31400, 197000, 668000, and 1920000.

It is to be noted that the PHA is produced by, for example, a microorganism such as *Alcaligenes eutrophus* AC32 produced by introducing a PHA synthetase gene derived from *Aeromonas caviae* into *Alcaligenes eutrophus* (International Deposit under Budapest Treaty, International Depository Authority: International Patent Organism Depositary, NITE, National Institute of Advanced Industrial Science and Technology (6 Chuo, 1-1-1, Higashi, Tsukuba, Ibaraki, Japan), Date of Original Deposit: Aug. 12, 1996, transferred on Aug. 7, 1997, Deposit Number FERM BP-6038 (transferred from original deposit FERM P-15786) (J. Bacteriol., 179, 4821 (1997)).

The PHA can be used as a soil-borne disease control agent and can be stored for several years in a storage space, such as a shed, usually used in a farm or an ordinary household because resin deterioration is less likely to occur.

Soil

In the present invention, any soil can be used as long as soil microorganisms live therein (soil microorganisms are contained therein).

The soil refers to a material layer that covers the surface of the ground and that has been influenced by biological activity.

The soil to be used is preferably excellent in all air permeability, water retentivity, and water drainability so as to be suitable for the growth of microorganisms. Examples of such soil include soils classified as sandy loam, loam, and clay loam. Further, the soil also preferably contains adequate organic matter and minerals and has a pH that is slightly acidic to about neutral.

Further, the soil preferably has an aggregated structure, in which soil particles are aggregated together, so as to be suitable for plant cultivation.

Examples of the soil include andosol, brown forest soil, and lowland soil, and plowed soil obtained by mixing at least one of these soils with organic matter, such as leaf mold, bark compost, or livestock manure compost, or a material containing many types and large amounts of soil microorganisms.

The soil microorganisms refer to the entirety of microorganisms that indigenously live in soil and constitute a microbial community. Examples of such soil microorganisms include various types of microorganisms such as: eukaryotic fungi including ascomycetous fungi, basidiomycetous fungi (e.g., molds and mushrooms), and ascomycetous yeasts; bacteria; and actinomycetes.

Further, the soil may contain a microorganism that has the function of decomposing the PHA (hereinafter, also referred to as PHA-decomposing microorganism) to control a soil-borne disease.

The soil preferably contains abundant soil microorganisms that live therein. This is because such soil contains many types and large populations of PHA-decomposing microorganisms and many types and large populations of microorganisms that have the function of decomposing the PHA and show some kind of antagonism against a pathogen that causes a soil-borne disease so that the effect of controlling a soil-borne disease can be enhanced.

The PHA-decomposing microorganism refers to a microorganism that decomposes the PHA into low molecules, and examples of such a PHA-decomposing microorganism include microorganisms belonging to the genera *Acidovorax, Alcaligenes, Aureobacterium, Comamonas, Marinobacter, Paucimonas, Pseudomonas, Steptomyces, Ilyobacter, Clostridum, Paecilomyces, Penicillium, Aspergillus, Xanthomonas, Bacillus*, and *Thermobifida*. The presence of the PHA in the soil is advantageous for the growth of the PHA-decomposing microorganisms.

It is known that the PHA-decomposing microorganisms are widely distributed in soils, rivers, and seawater. According to JP 2000-157258 A, soil shows a correlation between the degree of suppression of the growth of a white root rot fungus and the degree of diversity of bacteria present therein. Therefore, it is recognized that the diversity of the PHA-decomposing microorganisms is important to suppress the growth of a white root rot fungus in a soil environment.

Here, the "microorganism that shows antagonism" refers to a microorganism that has a suppressive action, such as killing, proliferation inhibition, or growth inhibition, on another microorganism.

Examples of the soil-borne disease include white root rot caused by a white root rot fungus (belonging to the same taxonomic group as ascomycetous fungi), Armillaria root rot, violet root rot, an epiphytotic disease, and crown gall Examples of a microorganism that shows antagonism against a white root rot fungus include fungi belonging to the genera *Trichoderma, Glomus, Penicillium, Beauveria, Clonostachys*, and *Sordaria*, bacteria belonging to the genera *Bacillus* and *Pseudomonas*, and actinomycetes belonging to the genus *Streptomyces*.

Examples of a microorganism that shows antagonism against a pathogen that causes Armillaria root rot include fungi belonging to the genera *Trichoderma* and *Chaetomium*.

Examples of a microorganism that shows antagonism against a pathogen that causes violet root rot include fungi belonging to the genera *Trichoderma* and *Glomus*.

Examples of a microorganism that shows antagonism against a pathogen that causes Phytophthora disease include fungi belonging to the genus *Trichoderma* and bacteria belonging to the genus *Pseudomonas*.

Examples of a microorganism that shows antagonism against a pathogen that causes crown gall include bacteria belonging to the genus *Rhizobium* which are non-pathogenic for plants.

Control Method 1

The present inventors have developed a soil-borne disease control method comprising application of the PHA. Here, the way to apply the PHA is not particularly limited as long as the PHA can act on soil to control a disease.

The application of the PHA to soil induces the growth of microorganisms that are universally present in soil and can decompose this polymer so that the soil can have the effect of controlling a disease.

This application makes it possible to abundantly grow indigenous PITA-decomposing microorganisms that originally live in the soil and microorganisms that have the function of decomposing the PHA and show antagonism against a pathogen that causes a soil-borne disease. As a result, the PHA-mixed soil abundantly contains microorganisms that show some kind of antagonism against a pathogen that causes a soil-borne disease, and therefore can have the effect of controlling a soil-borne disease, such as white root rot, for a long time.

The effectiveness of application of the PHA to soil on suppressing the growth of a white root rot fungus depends on, for example, the numbers and types of soil microorganisms naturally occurring in the soil, the properties of the soil, or conditions under which the soil is allowed to stand after mixing with the PHA (e.g., temperature and time).

Further, the application of the PHA makes it possible to significantly reduce the frequency of occurrence (incidence) of a soil-borne disease in cultivated plants and to significantly reduce the degree (severity) of the disease. Therefore, a soil-borne disease can be controlled in plant cultivation.

The PHA may be either directly applied to field soil or applied to soil placed in a container.

How long the effect of application of the PHA on suppressing the growth of a pathogen that causes a soil-borne disease lasts depends on, for example, the shape, size, or amount of the PHA used or the method of applying the PHA.

Particularly, the area of contact between the PHA and the PHA-decomposing microorganisms is preferably increased because the PHA-decomposing microorganisms can be efficiently grown and the PHA can be efficiently decomposed. In order to increase the area of contact between the PHA and the PHA-decomposing microorganisms, the PHA may be formed into a shape having a large surface area, such as powder, spheres, emulsion, or slurry. When required to have an immediate effect, the PHA preferably has a large surface area, that is, the PHA preferably has a small particle diameter, and when required to have sustained releasability, the PHA preferably has a large particle diameter. Further, the timing to exert the effect of the PHA may be adjusted by using the PHAs different in particle diameter in combination. For example, when formed into emulsion or slurry, the PHA may have an average particle diameter of 0.1 µm to 100 µm, and when formed into powder or spheres, the PHA may have an average particle diameter of 1 µm to 10 mm. The average particle diameter can be measured by, for example, a laser diffraction/scattering method (Microtrac method). More specifically, the average particle diameter of the PHA in the form of latex, slurry, or powder can be measured by a laser diffraction/scattering method (Microtrac method)

using Microtrac MT3300EXII manufactured by NIKKISO CO., LTD. as a measuring instrument.

Examples of the method of applying the PHA include a method in which the PHA is added to soil, a method in which the PHA and soil are mixed, a method in which the PHA is sprayed onto soil, a method in which soil is impregnated with the PHA, a method in which organisms (e.g., soil-living small animals) to which the PHA has been adhered are released into soil, and a method in which the PHA is brought into contact with soil by, for example, injecting the PHA into holes formed in the soil. Among them, a method in which the PHA and soil are mixed is preferred. This is because the PHA-decomposing microorganisms can be efficiently grown, and the PHA can be efficiently decomposed. On the other hand, a method in which the PHA in the form of slurry is sprayed onto soil is excellent in work efficiency and places a minimal burden on a worker although there is a fear that the loss of the PHA is caused because the PHA reaches far away from roots (positions away from roots). However, the loss can be reduced by increasing the viscosity of the slurry and placing the slurry in target positions. It is to be noted that soil obtained by mixing with the PHA is also referred to as PHA-mixed soil.

The application of the PHA is preferably performed by uniformly dispersing the PHA in soil around roots. In order to uniformly disperse the PHA, for example, a sprayer, a sprinkler, a fertilizer spreader, or a cultivator may be used.

The volume ratio of the PHA to be applied to soil is preferably 1% or more of the total volume of the PHA and the soil. When the volume ratio of the PHA is 1% or more, the growth of a white root rot fungus is very effectively suppressed.

Further, the amount of the PHA to be mixed to prepare PHA-mixed soil is preferably 1 to 60 parts by volume, more preferably 5 to 40 parts by volume per 100 parts by volume of soil.

After the PHA is brought into contact with soil by, for example, mixing the PHA and soil, the PHA-mixed soil is preferably allowed to stand for a certain period of time. This makes it possible to abundantly and specifically grow microorganisms that show some kind of antagonism against an indigenous pathogen that originally lives in the soil and causes a soil-borne disease.

The PHA-mixed soil is preferably allowed to stand under conditions suitable for the growth of the PHA-decomposing microorganisms. A preferred temperature is, for example, 10 to 30° C., and the PHA-mixed soil preferably contains water to the extent that anaerobic conditions are not created.

Further, the time period during which the PHA-mixed soil is allowed to stand is not particularly limited, but is preferably 1 week or longer but 6 months or shorter after mixing the PHA and soil. If the time period is shorter than 1 week, there is a case where the growth of a soil-borne pathogen cannot be suppressed, and even if the time period exceeds 6 months, the growth of a soil-borne pathogen is not suppressed in proportion to the length of the time period. When the time period after the mixing of the PHA and soil is 6 months or shorter, the PHA-decomposing microorganisms are rapidly grown as the time period during which the PHA-mixed soil is allowed to stand increases.

Soil containing the PHA, such as soil obtained by mixing the PHA and soil, can be used as soil for plant cultivation. For example, soil containing the PHA may be used as culture soil when plants are cultivated using pots, planters, and the like. Alternatively, soil containing the PHA may be used as culture soil to be added to natural soil in fruit farms and agricultural fields. Examples of plants to be cultivated using soil containing the PHA include fruit trees and flowering trees such as pear (*Pyrus* species) trees, apple trees, grape trees, peach trees, plum trees, yellow peach trees, apricot trees, plum trees, loquat trees, ficus trees, kiwi trees, persimmon trees, chestnut trees, tea trees, cherry trees, maple trees, camellias, azaleas, and roses.

Control Method 2

The disease control method comprising application of the PHA may be performed not only by applying the PHA to soil but also by adhering the PHA to at least one above-ground part of a plant selected from, for example, leaves, branches, a stem/trunk, and fruit.

The application of the PHA to the above-ground part of a plant induces the growth of microorganisms that are universally present in the above-ground part and can decompose this polymer so that the above-ground part can have the effect of controlling a disease.

This application makes it possible to abundantly grow PITA-decomposing microorganisms that originally live in the above-ground part and microorganisms that have the function of decomposing the PHA and show antagonism against a pathogen that causes a disease. This allows the above-ground part to have the effect of controlling, for example, powdery mildew.

How long the effect of application of the PHA on suppressing the growth of a pathogen that causes a disease depends on the shape, size, or amount of the PHA used or the way to apply the PITA.

Particularly, the area of contact between the PITA and the PHA-decomposing microorganisms is preferably increased because the PHA-decomposing microorganisms can be efficiently grown and the PHA can be efficiently decomposed. In order to increase the area of contact between the PHA and the PHA-decomposing microorganisms, the PHA may be formed into a shape having a large surface area, such as powder, spheres, emulsion, or slurry. When required to have an immediate effect, the PHA preferably has a large surface area, that is, the PHA preferably has a small particle diameter, and when required to have sustained releasability, the PHA preferably has a large particle diameter. Further, the timing to exert the effect may be controlled by using PHA particles different in particle diameter in combination. The particle diameter may be an average particle diameter, and the average particle diameter may be, for example, 0.1 μm to 100 μm. The average particle diameter can be measured by, for example, a laser diffraction/scattering method (Microtrac method). More specifically, the average particle diameter of the PHA in the form of latex, slurry, or powder can be measured by a laser diffraction/scattering method (Microtrac method) using Microtrac MT3300EXII manufactured by NIKKISO CO., LTD. as a measuring instrument.

Examples of the way to apply the PHA include spraying the PHA from the above using an unmanned helicopter or the like, spraying the PHA from the ground using a sprayer or the like, coating with a holder having the PHA adhered thereto (made of, for example, another soft material like a cord, a cloth, a net, or the like). Among them, spraying the PHA from the ground is particularly preferred.

The application of the PHA is preferably performed by evenly dispersing the PHA over the surface of a plant. In order to uniformly disperse the PHA, for example, a sprayer, a sprinkler, or a fertilizer spreader may be used. Further, an additive may be added to efficiently adhere the PHA to a plant.

EXAMPLES

Hereinbelow, the present invention will be described with reference to examples, but the scope of the present invention is not limited to the examples.

Experimental Example 1

Effect of Mixing of PHA and Soil on Growth of White Root Rot Fungus

The effect of mixing of the PHA and soil on the growth of a white root rot fungus was examined.

(1) [Synthesis of PHBH as Type of PHA]

PHBH was produced by culturing strain KNK-631 (WO 2009/145164).

A seed culture medium had a composition of 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$ (pH 6.8).

A preculture medium had a composition of 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (prepared by dissolving 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$ in 0.1 N hydrochloric acid). Palm kernel oil was added as a carbon source in a concentration of 10 g/L at once.

A polyester resin production medium had a composition of 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, and 0.5 v/v % trace metal salt solution (prepared by dissolving 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$ in 0.1 N hydrochloric acid), and 0.05 w/v % BIOSPUREX 200K (defoaming agent manufactured by Cognis Japan Ltd.).

First, a glycerol stock of strain KNK-631 (50 μL) was inoculated into the seed culture medium (10 mL) and cultivated for 24 hours to perform seed culture. Then, 1.0 v/v % of the seed culture suspension was inoculated into 1.8 L of the preculture medium contained in a 3-liter jar fermenter (MDL-300 manufactured by B.E.MARUBISHI Co., Ltd.). The jar fermenter was operated under conditions of a cultivation temperature of 33° C., a stirring speed of 500 rpm, and a ventilation volume of 1.8 L/min to perform preculture for 28 hours while pH was controlled to fall within the range of 6.7 to 6.8. The pH control was performed using a 14% aqueous ammonium hydroxide solution.

Then, 1.0 v/v % of the preculture suspension was inoculated into 6 L of the production medium contained in a 10-liter jar fermenter (MDS-1000 manufactured by B.E.MARUBISHI Co., Ltd.). The jar fermenter was operated under conditions of a cultivation temperature of 28° C., a stirring speed of 400 rpm, and a ventilation volume of 6.0 L/min, and pH was controlled to fall within the range of 6.7 to 6.8. The pH control was performed using a 14% aqueous ammonium hydroxide solution. Palm oil was used as a carbon source. The cultivation was performed for 64 hours. After the completion of the cultivation, cells were collected by centrifugation, washed with methanol, and freeze-dried, and then the weight of the dried cells was measured.

Then, 100 mL of chloroform was added to 1 g of the obtained dried cells, and the mixture was stirred at room temperature for a whole day to extract a polyester resin from the cells. The cell debris was filtered out, and the filtrate was concentrated by an evaporator until the total volume thereof was reduced to 30 mL. Then, 90 mL of hexane was added thereto little by little, and the mixture was allowed to stand for 1 hour while being slowly stirred. The precipitated polyester resin was collected by filtration and vacuum-dried at 50° C. for 3 hours to obtain a polyester resin.

The obtained polyester resin was subjected to gas chromatography in the following manner to analyze a monomer unit composition.

In a vessel, 20 mg of the dried polyester resin was mixed with 2 mL of a sulfuric acid/methanol mixed liquid (15:85) and 2 mL of chloroform, and the vessel was tightly sealed. Then, the mixture was heated at 100° C. for 140 minutes to obtain a methyl ester of a polyester resin decomposition product. After cooling, 1.5 g of sodium hydrogen carbonate was added thereto little by little for neutralization, and the mixture was allowed to stand until generation of carbon dioxide gas was stopped. Then, the mixture was well mixed with 4 mL of diisopropyl ether and then centrifuged to obtain a supernatant. The monomer unit composition of the polyester decomposition product in the supernatant was analyzed by capillary gas chromatography.

The gas chromatography was performed using "GC-17A" manufactured by SHIMADZU CORPORATION as a gas chromatograph and "NEUTRA BOND-1" (column length: 25 m, column inner diameter: 0.25 mm, liquid film thickness: 0.4 μm) manufactured by GL Sciences Inc. as a capillary column. He gas was used as a carrier gas, a column inlet pressure was set to 100 kPa, and the amount of a sample to be injected was 1 μL. As for temperature conditions, the temperature was increased from an initial temperature of 100° C. to 200° C. at a rate of 8° C./min, and was further increased from 200 to 290° C. at a rate of 30° C./min. As a result of the analysis performed under the above conditions, the polyester resin was found to have a resin structure of PHBH. The ratio of 3-hydroxybutyric acid (3HB) was 89 mol %, and the ratio of 3-hydroxyhexanoic acid (3HH) was 11 mol %. Further, the polyester resin had a weight-average molecular weight of 650000 as measured by GPC (gel permeation chromatography ("Shodex GPC-101" manufactured by Showa Denko K.K.).

(2) [Preparation of Mixed Soil]

In a stainless steel cylindrical vessel, 1.6 L of farm soil (soil collected from a Japanese pear field in NARO Institute of Fruit Tree Science) as soil and 400 mL of the PHBH (powder, average particle diameter: 200 μm) were placed and mixed to prepare PHBH-mixed soil (FIG. 1A). The PHBH-mixed soil was allowed to stand at 23° C. in a dark place for a certain period of time. Then, the PHBH-mixed soil was appropriately used in the following tests. It is to be noted that sterile distilled water was appropriately sprayed on the surface of the PHBH-mixed soil to prevent the PHBH-mixed soil from drying during the time when the PHBH-mixed soil was allowed to stand.

(3) [Examination of Degree of Growth of White Root Rot Fungus in Mixed Soil]

A Japanese pear tree stick having a diameter of about 5 mm was cut into pieces having a thickness of about 5 mm and sterilized by autoclave. Then, a white root rot fungus (strain W563) was inoculated into the pieces and cultured for 2 weeks to prepare a source of inoculum of a white root rot fungus.

Then, about 30 mL of the PHBH-mixed soil was placed in a sterilized glass petri dish, and the surface of the PHBH-mixed soil was flattened. The PHBH-mixed soil used at this time was one that had been allowed to stand for 1 week or one that had been allowed to stand for 1 month. A hole having a diameter of about 5 mm was formed in the PHBH-mixed soil at the center of the petri dish, and the source of inoculum was placed in the hole so as to be in contact with the bottom of the petri dish without covering the upper surface of the source of inoculum with the PHBH-mixed soil.

Then, the petri dish was allowed to stand at 23° C. in a dark place. After 9 days, the length of a hypha that had fastest grown on the surface of the PHBH-mixed soil and on the bottom of the petri dish was linearly measured from the source of inoculum to the tip of the hypha (FIG. 2B). The hypha that had fastest grown refers to a hypha whose tip is farthest from the source of inoculum. The test using each of the PHBH-mixed soils was repeated 4 times, and the degree of growth of the white root rot fungus was expressed as the growth length of a hypha per day determined by linearly measuring the length from the source of inoculum to the tip of the hypha. In FIG. 3, the results of the test repeated 4 times using each of the PHBH-mixed soils are shown as the averages of the degree of growth of the white root rot fungus.

Further, a control test was performed in the same manner as in the above test except that farm soil collected from the Japanese pear field in NARO Institute of Fruit Tree Science was used without mixing with the PHBH (soil not mixed with the PHBH) instead of the PHBH-mixed soil. The measurement results of the degree of growth of the white root rot fungus are shown in FIG. 3.

(4) [Results]

As a result of measurement, in either case where the PHBH-mixed soil allowed to stand for 1 week was used or where the PHBH-mixed soil allowed to stand for 1 month was used, the growth of hyphae of the white root rot fungus was suppressed as compared to a case where the soil not mixed with the PHBH was used (FIG. 3). Particularly, the growth of hyphae was significantly suppressed on the bottom of the petri dish. For example, as can be seen from FIG. 2A, hypha hardly grew on the bottom of the petri dish when the PHBH-mixed soil allowed to stand for 1 month was used.

This revealed that the soil mixed with the PHBH more effectively suppressed the growth of the white root rot fungus than the soil not mixed with the PHBH.

It was estimated that such effective suppression of growth was due to the proliferation of PHBH-decomposing microorganisms showing antagonism against the white root rot fungus.

Experimental Example 2

Direct Effect of PHA on White Root Rot Fungus

As described above, it was estimated that the effect of the PHA-mixed soil on suppressing the growth of the white root rot fungus confirmed from Experimental Example 1 was due to the proliferation of microorganisms showing antagonism against the white root rot fungus. However, there is a possibility that the PHA itself has the effect of suppressing the growth of the white root rot fungus. Therefore, the following test was performed in an environment where no PITA-decomposing microorganisms were present to examine whether or not the PHA had the effect of suppressing the growth of the white root rot fungus.

(1) [Examination as to Whether PHA Has Effect of Suppressing Growth of White Root Rot Fungus under Aseptic Conditions]

About 50 mL of the PHBH (powder, average particle diameter: 200 μm) and 50 mL of distilled water were placed in a plant box, autoclaved at 105° C. for 15 minutes, and cooled to room temperature. Hereinafter, the thus obtained liquid was referred to as polymer suspension.

A paper disk having a diameter of 6 mm was dipped into the polymer suspension to adhere the polymer thereto, and was then directly placed on a potato dextrose agar plate medium whose nutrient was diluted to 1/10 (1/10 PDA medium).

On the same 1/10 PDA medium, a 4 mm-diameter fungus-containing disk-shaped agar piece excised from a PDA medium on which a white root rot fungus (strain W563) had been cultured was placed so as to be about 3 cm away from the paper disk (FIG. 4). Then, the white root rot fungus was cultured at 23° C. in a dark place. The test was repeated three times. The degree of growth of the white root rot fungus was regularly observed for 10 days.

Further, a control test was performed in the same manner as in the above test except that the white root rot fungus was cultured without placing the paper disk dipped in the polymer suspension on the 1/10 PDA medium.

(2) [Results]

As a result, even when the paper disk to which the polymer had been adhered by dipping it into the polymer suspension was present, the degree of growth of the white root rot fungus was similar to that when the paper disk was not placed on the 1/10 PDA medium (FIG. 4).

The degree of growth of the white root rot fungus did not depend on the presence or absence of the PHBH. From this, it was confirmed that the PHBH itself did not have the function of suppressing the growth of the white root rot fungus.

Experimental Example 3

Effect of Microorganisms Contained in PHA-Mixed Soil on White Root Rot Fungus

As described above, it was estimated that the effect of the PHBH-mixed soil prepared in Experimental Example 1 on suppressing the growth of the white root rot fungus was due to the proliferation of microorganisms showing antagonism against the white root rot fungus.

Therefore, the PHBH-mixed soil was sterilized to examine whether or not the effect of the PHBH-mixed soil on suppressing the growth of the white root rot fungus was changed by sterilization.

(1) [Examination as to Whether Effect of PHA-Mixed Soil on Suppressing Growth of White Root Rot Fungus is Changed by Sterilization]

PHBH-mixed soil was prepared according to the process of preparing mixed soil described in Experimental Example 1, and was allowed to stand for 1 week. Then, according to the examination process described in Experimental Example 1, the PHBH-mixed soil was placed in a petri dish, and the source of inoculum of a white root rot fungus was placed in a hole formed in the PHBH-mixed soil at the center of the petri dish.

On the other hand, about 30 mL of the PHBH-mixed soil was placed in a sterilized glass petri dish, autoclaved at 110° C. for 10 minutes, and cooled to room temperature. Then, according to the examination process described in Experimental Example 1, the source of inoculum of a white root rot fungus was placed in a hole formed in the autoclaved PHBH-mixed soil at the center of the petri dish.

After the source of inoculum of a white root rot fungus was placed in the hole, each of the petri dishes was allowed to stand at 23° C. in a dark place. After 9 days, the length of a hypha was measured on each of the surface of the PHBH-mixed soil and the bottom of the petri dish. The test using each of the PHBH-mixed soils was repeated 4 times, and the degree of growth of the white root rot fungus was expressed as the growth length of a hypha per day determined by linearly measuring the length from the source of inoculum to the tip of the hypha. In FIG. 5, the results of the test repeated 4 times are shown as the averages of the degree of growth of the white root rot fungus.

Further, a control test was performed in the same manner as in the above test except that farm soil collected from the Japanese pear field in NARO Institute of Fruit Tree Science was used without mixing with the PHBH (soil not mixed with the PHBH) instead of the PHBH-mixed soil. The measurement results of the degree of growth of the white root rot fungus are shown in FIG. 5.

(2) [Results]

In either case where the PHBH-mixed soil was autoclaved or where the soil not mixed with the PHBH was autoclaved, the degree of growth of the white root rot fungus was higher as compared to a case where the PHBH-mixed soil was not autoclaved or the soil not mixed with the PHBH was not autoclaved, respectively (FIG. 5). Further, when the polymer-mixed soil was autoclaved, the white root rot fungus was significantly grown on the bottom of the petri dish.

This revealed that soil microorganisms were involved in suppressing the growth of the white root rot fungus, and particularly, soil microorganisms were greatly involved in suppressing the growth of the white root rot fungus in the PHBH-mixed soil. Particularly, it was estimated that the proliferation of PHBH-decomposing microorganisms greatly influenced the suppression of growth of the white root rot fungus in the PHBH-mixed soil.

Experimental Example 4

Effect of Allowing PHA-Mixed Soil to Stand for Long Time on Suppressing Growth of White Root Rot Fungus The following test was performed to examine whether or not the effect of PHBH-mixed soil on suppressing the growth of a white root rot fungus was maintained even when the PHBH-mixed soil was allowed to stand for a long time.

(1) [Preparation of Mixed Soil]

PHBH-mixed soil was prepared according to the process of preparing mixed soil described in Experimental Example 1.

(2) [Examination of Degree of Growth of White Root Rot Fungus in Mixed Soil after Long-Term Storage]

The degree of suppression of the growth of a white root rot fungus in the PHBH-mixed soil prepared above was examined by measuring the length of a hypha according to the measuring process described in Experimental Example 1. The mixed soil used at this time was one allowed to stand for 2 months or 6 months.

Further, a control test was performed in the same manner as in the above test except that farm soil collected from the Japanese pear field in NARO Institute of Fruit Tree Science was used as soil without mixing with the PHBH (soil not mixed with the PHBH) instead of the PHBH-mixed soil. The results are shown in FIG. 6.

(3) [Results]

Figure 6:
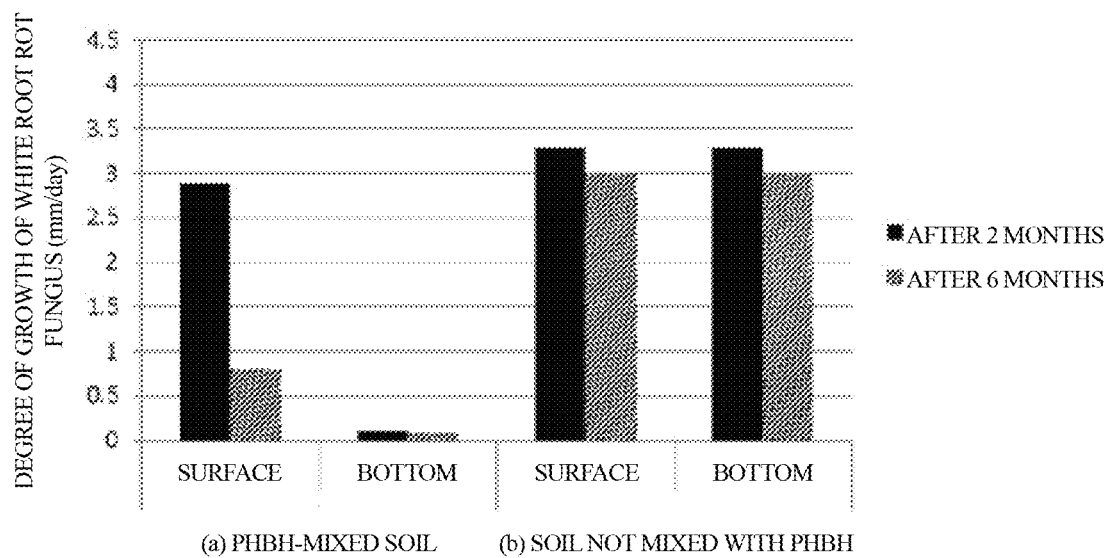
FIG. 6 is a graph showing the degree of growth of a white root rot fungus in PHBH-mixed soil (a) in Experimental Example 4 and the degree of growth of a white root rot fungus in soil not mixed with PHBH (b) in Experimental Example 4.

As a result, when the PHBH-mixed soil was allowed to stand for 2 months or 6 months, the degree of growth suppression was equal to or higher than that when the PHBH-mixed soil was allowed to stand for 1 week or 1 month in Experimental Example 1 (FIGS. 2, 3, and 6).

This revealed that the PHBH-mixed soil exhibited the growth suppression effect after being allowed to stand for 1 week from mixing with the PHBH, and the growth suppression effect was maintained or gradually increased for 6 months during which the PHBH-mixed soil was allowed to stand.

Experimental Example 5

Effect of PHA-Mixed Soil on Controlling White Root Rot (Partial Treatment)

The following test was performed to examine whether or not PHA-mixed soil had the effect of suppressing white root rot when a plant was actually cultivated. In this experimental example, PHBH-mixed soil was brought into contact with part of a plant to examine the effect.

(1) [Disease Suppression Test]

Farm soil collected from the Japanese pear field in NARO Institute of Fruit Tree Science was placed to a depth of about 1 cm at the bottom of a pot (diameter: 9 cm), and then a source of inoculum of a white root rot fungus was buried in the farm soil. The source of inoculum used at this time was prepared by culturing a white root rot fungus (strain W563) inoculated into a sterilized Japanese pear tree stick piece (length: 3 to 4 cm, diameter: 0.8 to 1 cm) for about 1 month.

Figure 7A:
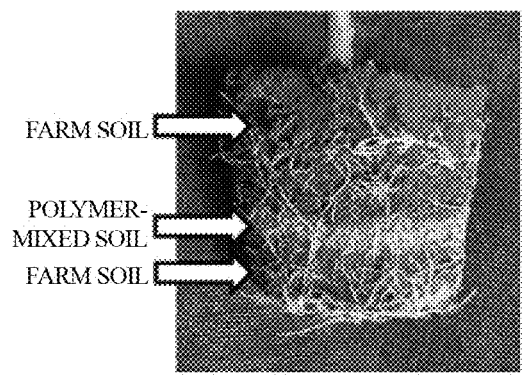
FIG. 7A is a photograph showing the growth of a white root rot fungus in PHBH-mixed soil (allowed to stand for 1 month) in Experimental Example 5.
Figure 7B:
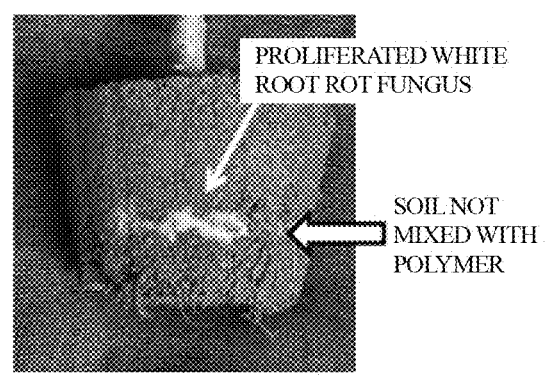
FIG. 7B is a photograph showing the growth of a white root rot fungus in soil not mixed with PHBH in Experimental Example 5.

Further, about 30 mL of PHBH-mixed soil was placed on the source of inoculum, and the surface of the PHBH-mixed soil was flattened (FIG. 7). The PHBH-mixed soil used was prepared according to the process of preparing mixed soil described in Experimental Example 1 and allowed to stand for 1 month or 6 months.

A soil-containing pot for a control test was prepared in the same manner as described above except that farm soil collected from the Japanese pear field in NARO Institute of Fruit Tree Science was used without mixing with the PHBH (soil not mixed with the PHBH) instead of the PHBH-mixed soil.

The roots of 2-year apple rootstocks were washed with tap water, and the rootstocks were transplanted to the pot containing the PHBH-mixed soil and the pot containing farm soil collected from the Japanese pear field in NARO Institute of Fruit Tree Science but not mixed with the PHBH (soil not mixed with the PHBH), respectively, with the use of the farm soil (FIG. 7), and were then grown at 25° C. in an environmental control glass room. Six pot plants were used for each of the test using the pots containing the PHBH-mixed soil allowed to stand for 1 month, the test using the pots containing the PHBH-mixed soil allowed to stand for 6 months, and the test using the pots containing the soil not mixed with the PHBH.

Figure 7C:
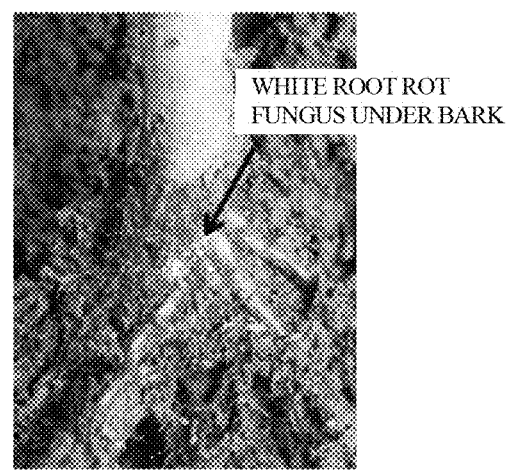
FIG. 7C is a photograph showing roots affected by white root rot in Experimental Example 5.
Figure 8:
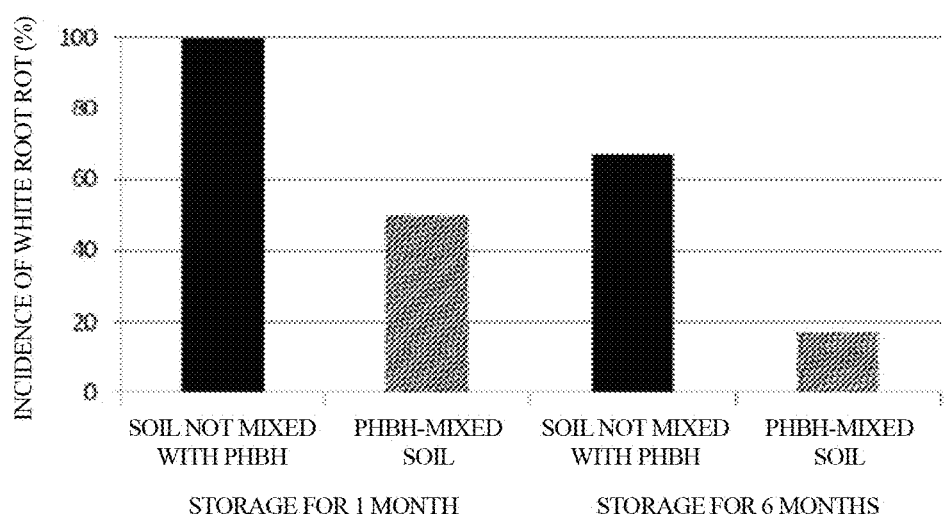
FIG. 8 is a graph showing the incidence of white root rot in PHBH-mixed soil and the incidence of white root rot in soil not mixed with PHBH in Experimental Example 5.

After 2 months, the plants were dug out of the soil to observe the degree of rot of the underground parts (roots) thereof, and the percentage of the plants that had developed a disease (incidence of disease) was calculated. The results are shown in FIG. 8. When the roots were rotted and the hyphae of the white root rot fungus were observed under the bark, the plant was judged to have developed a disease. The same applies to Experimental Example 6. An example of the diseased plant is shown in FIG. 7C.

(2) [Results]

As a result, it was confirmed that in either case where the PHBH-mixed soil allowed to stand for 1 month was used or where the PHBH-mixed soil allowed to stand for 6 months was used, the incidence of white root rot was as low as 1/2 or less of that of the control test (FIGS. 7 and 8).

Further, in either case where the PHBH-mixed soil allowed to stand for 1 month was used or where the PHBH-mixed soil allowed to stand for 6 months was used, the roots were healthy, but when the soil not mixed with the PHBH was used, the roots were rotted (FIG. 7).

Experimental Example 6

Effect of PHA-Mixed Soil on Controlling White Root Rot (Entire Treatment)

The following test was performed to examine whether or not PHA-mixed soil had the effect of suppressing white root rot when a plant was actually cultivated. In this experimental example, a plant was grown in PHBH-mixed soil to examine the effect.

(1) [Disease Suppression Test]

The roots of a 2-year apple rootstock were washed with tap water, and the rootstock was transplanted to a pot (diameter: 9 cm) with the use of PHBH-mixed soil (just after mixing) (FIG. 9) and was grown at 25° C. in an environmental control glass room for 1 month or 2 months. At this time, the pot was not completely filled with the soil to leave a space of 1 to 2 cm in the upper part of the pot.

Farm soil collected from the Japanese pear field in NARO Institute of Fruit Tree Science was placed to a depth of about 1 cm at the bottom of a new pot (diameter: 9 cm), and then a source of inoculum of a white root rot fungus was buried in the farm soil. The source of inoculum used at this time was prepared by culturing a white root rot fungus (strain W563) inoculated into a sterilized Japanese pear tree stick piece (length: 3 to 4 cm, diameter: 0.8 to 1 cm) for about 1 month.

The apple rootstock grown in the PHBH-mixed soil for 1 month or 2 months was taken out of the pot together with the soil, placed on the source of inoculum (FIG. 9), and continuously grown at 25° C. Six pot plants were used for each of the test of growing an apple rootstock for 1 month and the test of growing an apple root stock for 2 months.

After 2 months, the plants were dug out of the soil to observe the degree of rot of the underground parts (roots) thereof, and the percentage of the plants that had developed a disease (incidence of disease) was calculated.

A control test was performed in the following manner. Apple rootstocks were grown in the same manner as in the above test except that farm soil collected from the Japanese pear field in NARO Institute of Fruit Tree Science (soil not mixed with the PHBH) was used instead of the PHBH-mixed soil. Then, the plants were dug out of the soil to observe the degree of rot of the underground parts (roots) thereof, and the percentage of the plants that had developed a disease (incidence of disease) was calculated. The results are shown in FIG. 10.

(2) [Results]

Figures 9A, 9B:
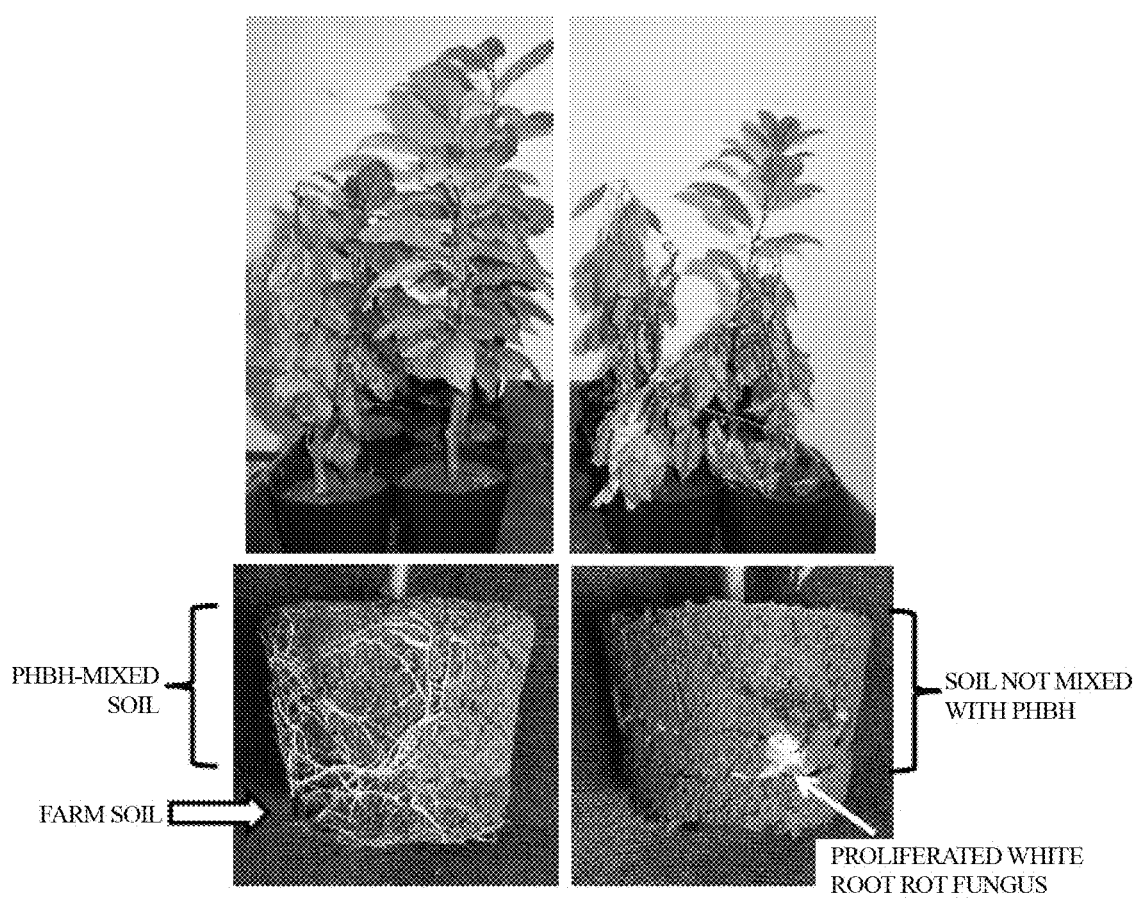
FIG. 9A is a photograph showing the growth of a white root rot fungus in PHBH-mixed soil in Experimental Example 6.
FIG. 9B is a photograph showing the growth of a white root rot fungus in soil not mixed with PHBH in Experimental Example 6.
Figure 10:
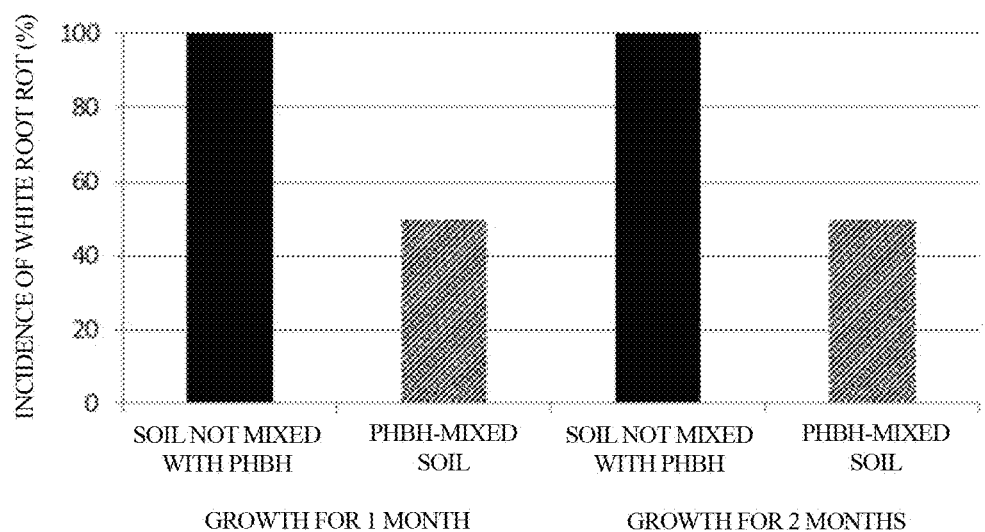
FIG. 10 is a graph showing the incidence of white root rot in the PHBH-mixed soil and the incidence of white root rot in the soil not mixed with PHBH in Experimental Example 6.

As a result, it was confirmed that in either case where the plants were grown in the PHBH-mixed soil for 1 month or where the plants were grown in the PHBH-mixed soil for 2 months, the incidence of white root rot was as low as 1/2 of that of the control test (FIGS. 9 and 10).

Further, when the PHBH-mixed soil (just after mixing) was used, the roots were healthy, but when the soil not mixed with the PHBH was used, the roots were rotted (FIG. 9).

Experimental Example 7

Effect of Allowing PHA-Mixed Soil to Stand for Long Time of One Year or More on Suppressing Growth of White Root Rot Fungus The following test was performed to examine whether or not the effect of PHBH-mixed soil on suppressing the growth of a white root rot fungus was maintained even when the PHBH-mixed soil was allowed to stand for a long time of one year or more.

(1) [Preparation of Mixed Soil]

PHBH-mixed soil was prepared according to the process of preparing mixed soil described in Experimental Example 1.

(2) [Examination of Degree of Growth of White Root Rot Fungus in Mixed Soil after Long-Term Storage]

The degree of suppression of the growth of a white root rot fungus in the PHBH-mixed soil prepared above was examined by measuring the length of a hypha in the same manner as in Experimental Example 1 except that only the degree of growth of a white root rot fungus on the bottom surface of a petri dish was measured. The mixed soil used at this time was one allowed to stand for 15 months.

Further, a control test was performed in the same manner as in the above test except that farm soil collected from the Japanese pear field in NARO Institute of Fruit Tree Science was used as soil without mixing with the PHBH (soil not mixed with the PHBH) instead of the PHBH-mixed soil. The results are shown in FIG. 11.

(3) [Results]

Figure 11:
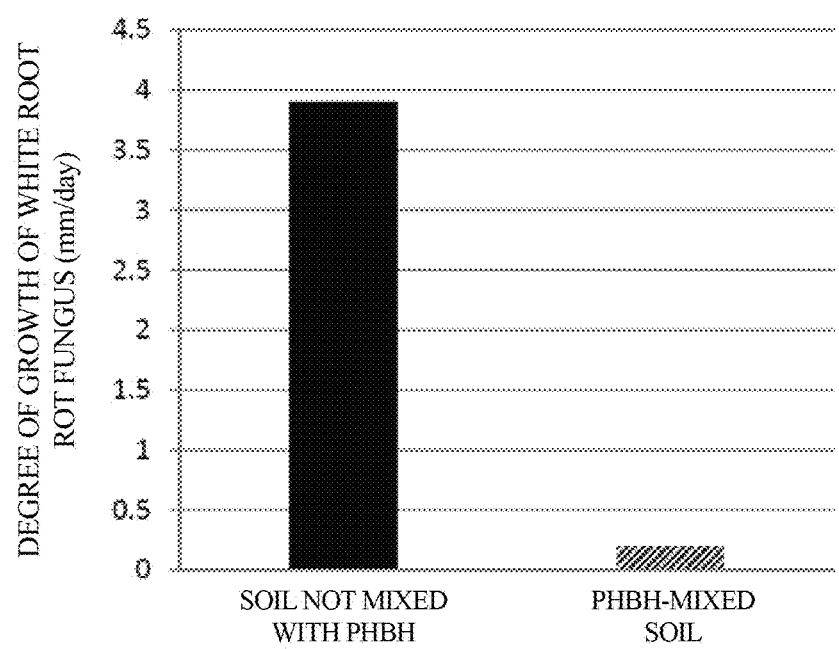
FIG. 11 is a graph showing the degree of growth of a white root rot fungus in PHBH-mixed soil and the degree of growth of a white root rot fungus in soil not mixed with PHBH in Experimental Example 7.

As a result, when the PHBH-mixed soil was allowed to stand for 15 months, the degree of growth suppression was as high as that when the PHBH-mixed soil was allowed to stand for 1 week or 1 month in Experimental Example 1 or when the PHBH-mixed soil was allowed to stand for 2 months or 6 months in Experimental Example 4 (FIG. 11).

This revealed that the PHBH-mixed soil exhibited the growth suppression effect after being allowed to stand for 1 week from mixing with the PHBH, and the growth suppression effect was maintained for 15 months during which the PHBH-mixed soil was allowed to stand.

Experimental Example 8

Influence of Difference of Soil to Be Mixed with PHA on Suppressing Growth of White Root Rot Fungus The following test was performed to examine whether or not the difference of soil to be mixed with the PHBH influences the effect of suppressing the growth of a white root rot fungus.

(1) [Soil Used]

Farm soil collected from a grape field in the fruit tree experiment station in Suzaka City, Nagano Prefecture and commercially-available black soil (produced in Tochigi Prefecture, TACHIKAWAHEIWANOUEN CO., LTD.) were used.

(2) [Preparation of Mixed Soil]

PHBH-mixed soil was prepared according to the process described in "Preparation of Mixed Soil" in Experimental Example 1.

(3) [Examination of Degree of Growth of White Root Rot Fungus in Mixed Soil after Storage]

The degree of suppression of the growth of a white root rot fungus in the PHBH-mixed soil prepared above was examined by measuring the length of a hypha in the same manner as in Experimental Example 1 except that only the degree of growth of a white root rot fungus on the bottom surface of a petri dish was measured. The mixed soil used at this time was one allowed to stand for 1 month.

Further, a control test was performed in the same manner as in the above test except that farm soil collected from the grape field in the fruit tree experiment station in Suzaka City, Nagano Prefecture or commercially-available black soil (produced in Tochigi Prefecture, TACHIKAWA HEIWA NOUEN CO., LTD.) was used as soil without mixing with the PHBH instead of the PHBH-mixed soil. The results are shown in FIG. 12.

(4) [Results]

As a result, when farm soil collected from the grape field in the fruit tree experiment station in Suzaka City, Nagano Prefecture or commercially-available black soil (produced in Tochigi Prefecture, TACHIKAWAHEIWANOUEN CO., LTD.) was used, the degree of growth suppression was as high as that in Experimental Example 1 in which farm soil collected from the Japanese pear field in NARO Institute of Fruit Tree Science was used (FIG. 12).

This revealed that the growth suppression effect did not significantly depend on the difference in soil to be mixed with the PHBH.

Experimental Example 9

Influence of Difference of Amount of PHA to Be Mixed with Soil on Suppressing Growth of White Root Rot Fungus The following test was performed to examine whether or not the difference of the amount of the PHBH to be mixed with soil influences the effect of suppressing the growth of a white root rot fungus.

(1) [Preparation of Mixed Soil]

PHBH-mixed soil was prepared according to the process described in "Preparation of Mixed Soil" in Experimental Example 1. At this time, the amounts of materials used were changed as follows. In stainless steel cylindrical vessels, 800 mL of farm soil (soil collected from the Japanese pear field in NARO Institute of Fruit Tree Science) as soil and 200 mL of the PHBH (powder, average particle diameter: 200 μm) (volume ratio: 20%), 950 mL of the farm soil and 50 mL of the PHBH (volume ratio: 5%), 990 mL of the farm soil and 10 mL of the PHBH (volume ratio: 1%), 999 mL of the farm soil and 1 mL of the PHBH (volume ratio: 0.1%), and 999.9 mL of the farm soil and 0.1 mL of the PHBH (volume ratio: 0.01%) were placed, respectively. The PHBH and the soil in each of the vessels were mixed to prepare PHBH-mixed soil, and the PHBH-mixed soil was allowed to stand at 23° C. in a dark place for a certain period of time. Then, the PHBH-mixed soil was appropriately used in the following tests. It is to be noted that sterile distilled water was appropriately sprayed on the surface of the PHBH-mixed soil to prevent the PHBH-mixed soil from drying during the time when the PHBH-mixed soil was allowed to stand.

(2) [Examination of Degree of Growth of White Root Rot Fungus in Mixed Soil after Storage]

The degree of suppression of the growth of a white root rot fungus in the PHBH-mixed soil prepared above was examined by measuring the length of a hypha in the same manner as in Experimental Example 1 except that only the degree of growth of a white root rot fungus on the bottom surface of a petri dish was measured. The mixed soil used at this time was one allowed to stand for 1 month or 2 months.

Further, a control test was performed in the same manner as in the above test except that farm soil collected from the Japanese pear field in NARO Institute of Fruit Tree Science was used as soil without mixing with the PHBH (soil not mixed with the PHBH) instead of the PHBH-mixed soil. The results are shown in FIG. 13.

(3) [Results]

Figure 13:
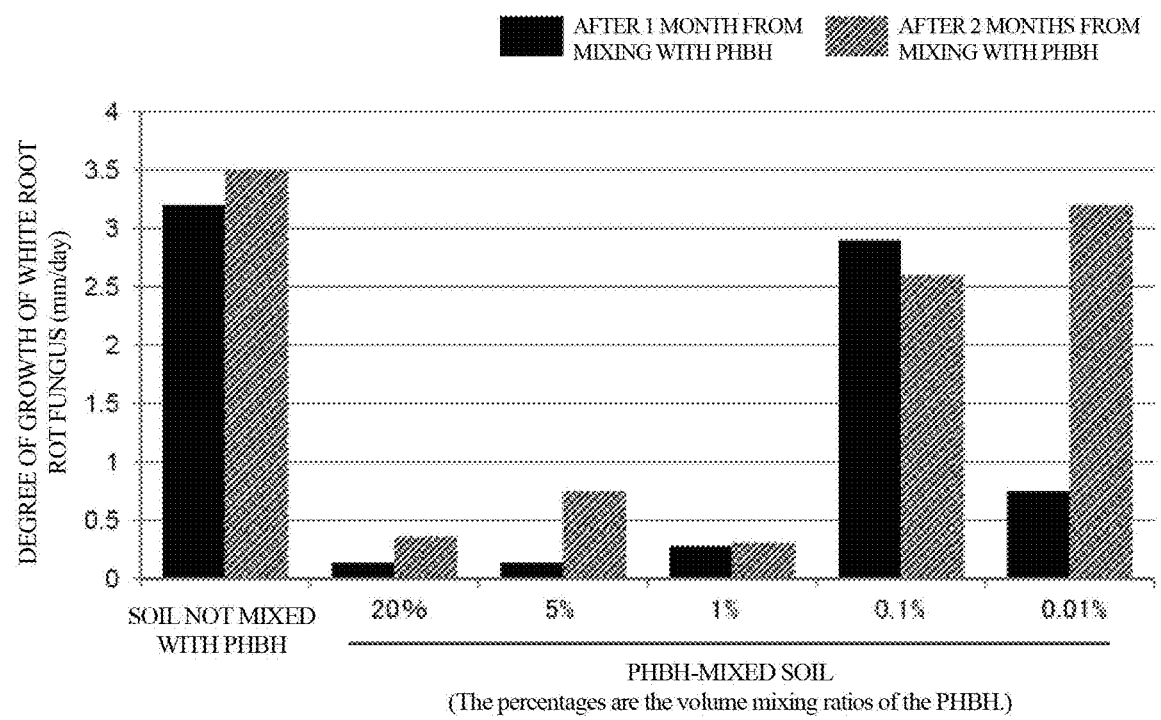
FIG. 13 is a graph showing the degrees of growth of a white root rot fungus at different volume ratios of PHBH in soil in Experimental Example 9.

As a result, when the PHBH-mixed soil whose mixing ratio by volume of the PHBH was 5% or 1% was used, the degree of growth suppression was as high as that when the PHBH-mixed soil whose mixing ratio by volume of the PHBH was 20% was used as in the case of Experimental Example 1 (FIG. 13).

This revealed that the PHBH-mixed soil highly effectively suppressed the growth of a white root rot fungus when the PHBH was mixed so that the ratio of the volume of the PHBH to the total volume of the PHBH and the soil was 1% or more.

Experimental Example 10

Effect of PHA-Mixed Soil on Controlling Armillaria Root Rot

The following test was performed to examine whether or not PHA-mixed soil had the effect of suppressing Armillaria root rot. Armillaria root rot is a soil-borne disease, and *Armillaria mellea* (belonging to the same taxonomic group as basidiomycetous fungi) that is an Armillaria root rot pathogen rots the roots of woody plants including fruit trees.

(1) [Disease Suppression Test]

Farm soil collected from the Japanese pear field in NARO Institute of Fruit Tree Science and vermiculite were mixed in a volume ratio of 10:1, and the mixture was placed to a depth of about 1 cm at the bottom of a pot (diameter: 9 cm). Then, a source of inoculum of an Armillaria root rot fungus was buried in the mixture. The source of inoculum used at this time was prepared by culturing an Annillaria root rot fungus (strain P-A) inoculated into a sterilized Japanese pear tree stick piece (length: 3 to 4 cm, diameter: 0.8 to 1 cm) for about 2 months.

Further, as in the case of Experimental Example 5, about 30 mL of PHBH-mixed soil was placed on the source of inoculum, and the surface of the PHBH-mixed soil was flattened. The PHBH-mixed soil used was prepared according to the process of preparing mixed soil described in Experimental Example 1 and allowed to stand for 4.5 months.

A soil-containing pot for a control test was prepared in the same manner as described above except that farm soil collected from the Japanese pear field in NARO Institute of Fruit Tree Science was used without mixing with the PHBH (soil not mixed with the PHBH) instead of the PHBH-mixed soil.

The roots of 2-year apple rootstocks (*Malus prunifolia* var. ringo) were washed with tap water, and the tips of all the roots were cut. The apple rootstocks were transplanted to the pot containing a mixture obtained by mixing the PHBH-mixed soil using farm soil collected from the Japanese pear field and vermiculite in a volume ratio of 10:1 and the pot containing a mixture obtained by mixing farm soil collected from the Japanese pear field and not mixed with the PHBH (soil not mixed with the PHBH) and vermiculite in a volume ratio of 10:1, respectively, and were then grown at 25° C. in an environmental control glass room. Five pot plants were used for each of the test using the pots containing the PHBH-mixed soil and the test using the pots containing the soil not mixed with the PHBH.

Figure 14:
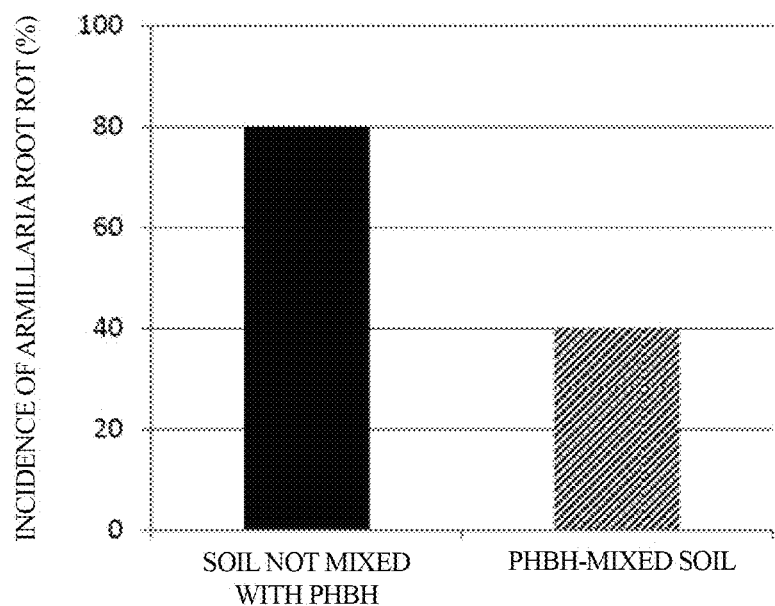
FIG. 14 is a graph showing the incidence of Armillaria root rot in PHBH-mixed soil and the incidence of Armillaria root rot in soil not mixed with PHBH in Experimental Example 10.
Figure 15:
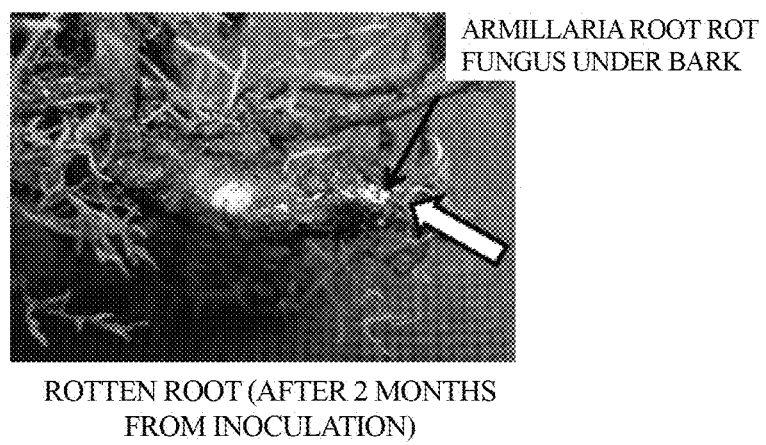
FIG. 15 is a photograph showing the degree of Armillaria root rot in Experimental Example 10.

After 2 months, the plants were dug out of the soil to observe the degree of rot of the underground parts (roots) thereof, and the percentage of the plants that had developed a disease (incidence of disease) was calculated. The results are shown in FIG. 14. When the roots were rotted and the hyphae of the Armillaria root rot fungus were observed under the bark thereof, the plant was judged to have developed a disease. An example of the diseased plant is shown in FIG. 15.

(2) [Results]

As a result, it was confirmed that when the PHBH-mixed soil was used, the incidence of Armillaria root rot was as low as 1/2 of that of the control test (FIG. 14). Further, when the PHBH-mixed soil was used, the roots were healthy, but when the soil not mixed with the PHBH was used, the roots were rotted (FIG. 15).

Experimental Example 11

Effect of PHA-Mixed Soil on Controlling Violet Root Rot

The following test was performed to examine whether or not PHA-mixed soil had the effect of suppressing violet root rot. Violet root rot is a soil-borne disease, and *Helicobasidium mompa* (belonging to the same taxonomic group as basidiomycetous fungi) that is a violet root rot pathogen rots the roots of woody plants including fruit trees and herbaceous plants.

(1) [Disease Suppression Test]

Farm soil collected from the Japanese pear field in NARO Institute of Fruit Tree Science and vermiculite were mixed in a volume ratio of 10:1, and the mixture was placed to a depth of about 2 cm at the bottom of a plastic vat (length: 35 cm, width: 25 cm). Then, a source of inoculum of a violet root rot fungus was buried in two positions in the mixture. The source of inoculum used at this time was prepared by culturing a violet root rot fungus (strain V650) inoculated into a sterilized apple tree stick piece (length: 3 to 4 cm, diameter: 0.8 to 1 cm) for about 1 month.

Further, about 30 mL of PHBH-mixed soil was placed on the sources of inoculum so that each of the sources of inoculum was uniformly covered with the PHBH-mixed soil. The PHBH-mixed soil used was prepared according to the process of preparing mixed soil described in Experimental Example 1 and allowed to stand for 5 months.

A soil-containing vat for a control test was prepared in the same manner as described above except that farm soil collected from the Japanese pear field in NARO Institute of Fruit Tree Science was used without mixing with the PHBH (soil not mixed with the PHBH) instead of the PHBH-mixed soil.

One sweet potato tuberous root washed with tap water was placed on the PHBH-mixed soil or the farm soil collected from the Japanese pear field in NARO Institute of Fruit Tree Science and not mixed with the PHBH (soil not mixed with PHBH) in each position where the source of inoculum had been placed, and then the 10:1 (volume ratio) mixture of farm soil collected from the Japanese pear field in NARO Institute of Fruit Tree Science and vermiculite was placed so as to completely cover the sweet potato tuberous roots. Then, the sweet potato tuberous roots were grown at 25° C. in an environmental control glass room. Four sweet potato tuberous roots were used in total for each of the test using the two vats containing the PHBH-mixed soil and the test using the two vats containing the soil not mixed with the PHBH.

Figure 16A:
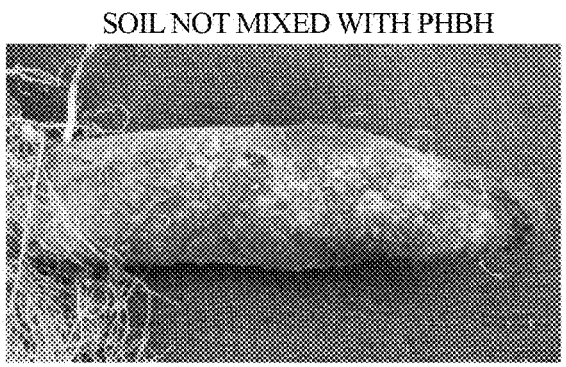
FIG. 16A and FIG. 16B are photographs showing a diseased area of a tuberous root affected with violet root rot in Experimental Example 11.
Figure 16B:
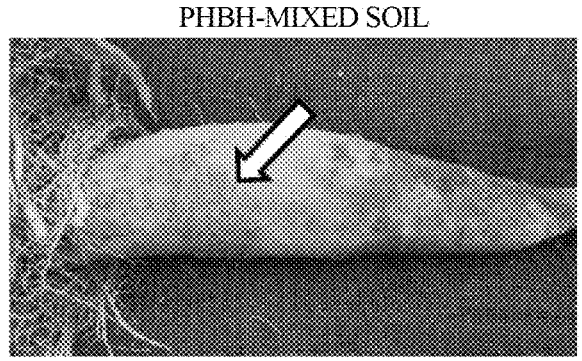
Figure 17:
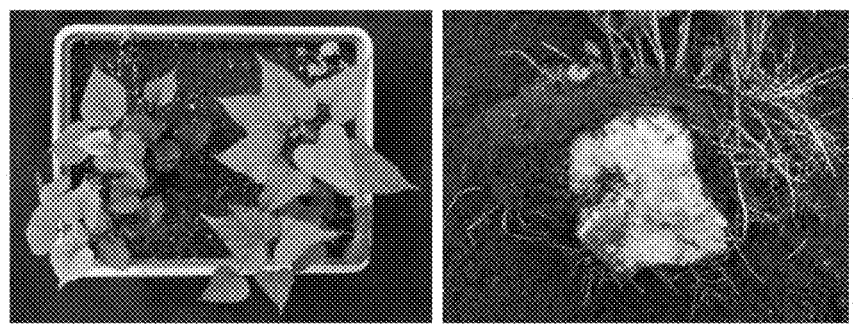
FIG. 17 shows photographs showing the degree of violet root rot in Experimental Example 11.

After 1.5 months, the tuberous roots were dug out of the soil to observe whether they had developed a disease. The percentage of a diseased area to the entire tuberous root was calculated. The results are shown in FIG. 16. When the soil not mixed with the PHBH was used, the tuberous roots developed violet root rot in their entirety, and the severity of disease was 90%. On the other hand, when the PHBH-mixed soil was used, the tuberous roots developed violet root rot only in part thereof, and the severity of disease was 20%. When a structure, called infection cushion, formed when the violet root rot fungus invaded a plant was observed on the surface of the tuberous root, the tuberous root was judged to have developed violet root rot. An example of the diseased tuberous root is shown in FIG. 17.

(2) [Results]

Figure 18:
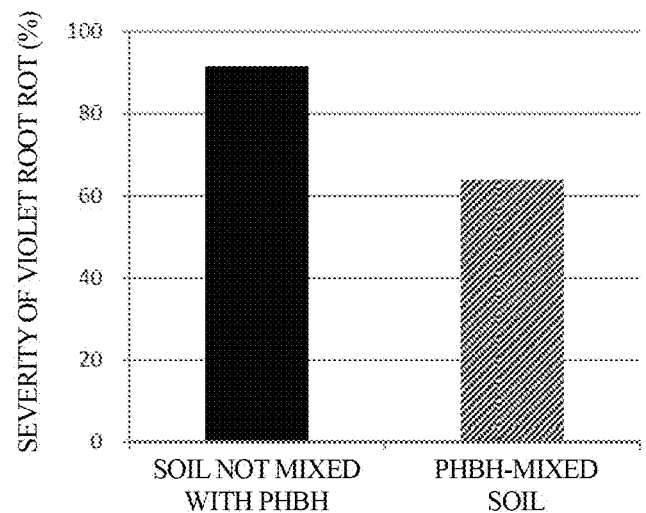
FIG. 18 is a graph showing the incidence of violet root rot in PHBH-mixed soil and the incidence of violet root rot in soil not mixed with PHBH in Experimental Example 11.

As a result, it was confirmed that when the PHBH-mixed soil was used, the severity of violet root rot was as low as 2/3 of that of the control test (FIG. 18). Further, when the PHBH-mixed soil was used, the tuberous roots were healthy, but when the soil not mixed with the PHBH was used, the tuberous roots were rotted (FIG. 17).

Experimental Example 12

Effect of PHA-Mixed Soil on Controlling Epiphytotic Disease

The following test was performed to examine whether or not PHA-mixed soil had the effect of suppressing an epiphytotic disease. Phytophthora disease is a soil-borne disease or a disease that affects leaves or fruit, and *Phytophthora cactorum* (belonging to the same taxonomic group as oomycota as protists) that is an epiphytotic pathogen rots the trunk/stem and leaves/fruit of woody plants including fruit trees and herbaceous plants.

(1) [Disease Suppression Test]

About 20 mL of PHBH-mixed soil was placed at the bottom of a plant box (manufactured by AGC TECHNO GLASS CO., LTD.). The PHBH-mixed soil used was prepared according to the process described in "Preparation of Mixed Soil" in Experimental Example 1 and allowed to stand for 4.5 months.

A source of inoculum was prepared by culturing an epiphytotic pathogen (strain 58-a-1) inoculated into sterilized wheat grains for about 2 months. The cultured wheat grains (1 g dry weight) as a source of inoculum was mixed into the soil placed in the plant box, and then sterile distilled water was poured into the plant box until the water floated on the surface of the soil.

A soil-containing plant box for a control test was prepared in the same manner as described above except that farm soil collected from the Japanese pear field in NARO Institute of Fruit Tree Science was used without mixing with the PHBH (soil not mixed with the PHBH) instead of the PHBH-mixed soil.

One young fruit of Japanese pear (diameter: 3 to 3.5 cm) washed with tap water was placed on the soil mixed with the source of inoculum. Six young fruits of Japanese pear were used for each of the test using the plant boxes containing the PHBH-mixed soil and the test using the plant boxes containing the soil not mixed with the PHBH.

Figure 19:
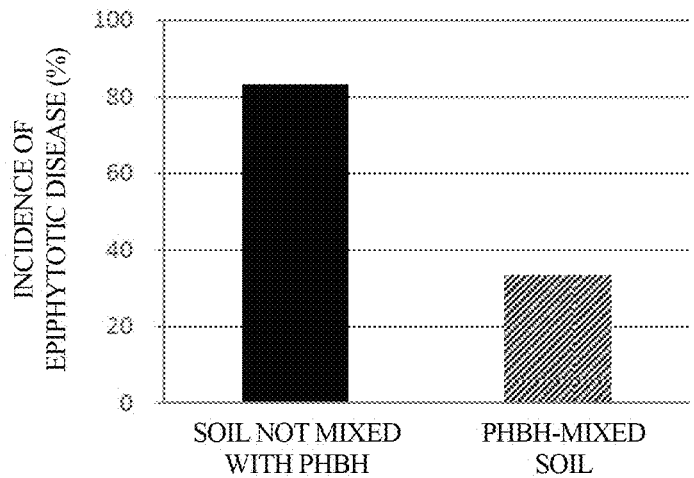
FIG. 19 is a graph showing the incidence of Phytophthora disease in PHBH-mixed soil and the incidence of Phytophthora disease in soil not mixed with PHBH in Experimental Example 12.
Figure 20A:
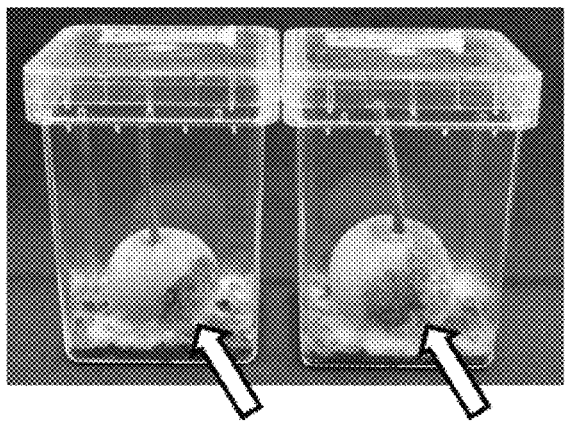
FIG. 20A and FIG. 20B are photographs showing the degree of Phytophthora disease in Experimental Example 12.
Figure 20B:
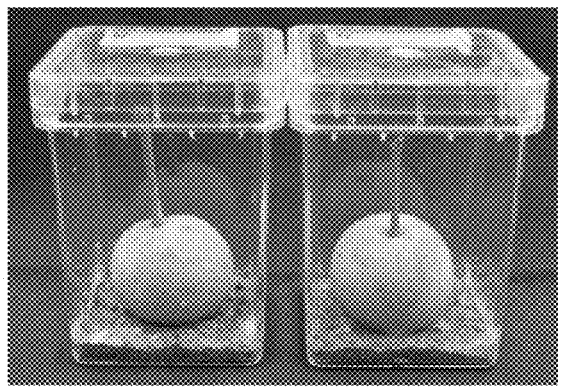

After 2 weeks, the young fruits were observed to determine whether they had developed a disease, and the percentage of the young fruits that had developed a disease (incidence of disease) was calculated. The results are shown in FIG. 19. When a black lesion characteristic of Phytophthora disease was observed on the surface of the young fruit, the young fruit was judged to have developed a disease. An example of the diseased young fruit is shown in FIG. 20.

(2) [Results]

Figure 21A:
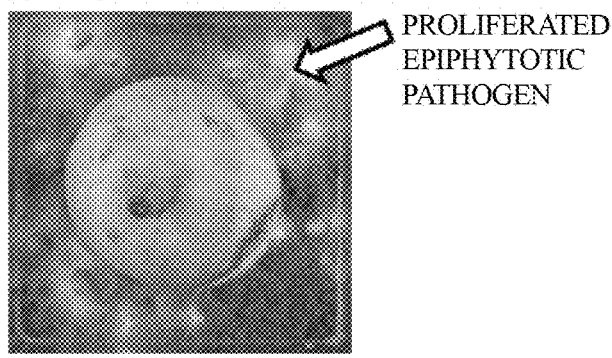
FIG. 21A and FIG. 21B are photographs showing the degree of proliferation of an epiphytotic pathogen in Experimental Example 12.
Figure 21B:
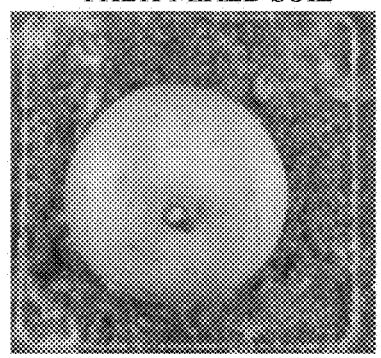

As a result, it was confirmed that when the PHBH-mixed soil was used, the incidence of Phytophthora disease was as low as 1/2 or less of that of the control test (FIG. 19). Further, when the PHBH-mixed soil was used, the epiphytotic pathogen was less proliferated than that in the control test (FIG. 21).

Experimental Example 13

Effect of PHA on Controlling Powdery Mildew

The following test was performed to examine whether or not PHA had the effect of suppressing powdery mildew. Powdery mildew is a disease that affects leaves and fruit, and *Podosphaera leucotricha* (belonging to the same taxonomic group as ascomycetous fungi) that is a powdery mildew pathogen spreads on the surfaces of apple tree leaves and fruits and inhibits photosynthesis to weaken apple trees.

(1) [Disease Suppression Test]

Apple tree leaves washed with sterile distilled water were placed in a sealed container containing Kimwipes wipers moistened with sterile distilled water, and were allowed to stand at 23° C. for 5 days.

Then, 100 mL of sterile distilled water and 10 mL of the PHBH (powder, average particle diameter: 200 μm) were mixed in a glass beaker, and the above apple tree leaves were dipped in the mixture to adhere the PHBH to the surfaces of the leaves. Then, the apple tree leaves were placed in a sealed container containing Kimwipes wipers moistened with sterile distilled water, and were allowed to stand at 23° C. for 2 days.

As a source of inoculum, 10 leaves with powdery mildew collected from apple trees planted in NARO Institute of Fruit Tree Science were used. The collected diseased leaves were placed on a sieve (opening: 4 mm), and the sieve was vibrated over the leaves to which PHBH had been adhered to allow the conidia of a powdery mildew pathogen to fall onto the leaves. Then, the powdery mildew pathogen was cultured at 23° C.

A sealed container containing apple tree leaves for a control test was prepared in the same manner as described above except that sterile distilled water not mixed with the PHBH was used instead of the sterile distilled water mixed with the PHBH. The number of the apple tree leaves to which the PHBH had been adhered was 5, and the number of the apple tree leaves to which the PHBH had not been adhered was 5.

After 10 days, the apple tree leaves were observed to determine whether they had developed a disease, and the average number of lesions per leaf was calculated. The results are shown in FIG. 22. When the whitish powdery spot of a powdery mildew fungus flora was observed on the surface of the leaf, the leaf was judged to have the lesion of powdery mildew, and a continuous block of the flora was regarded as one lesion. An example of the lesion formed on the surface of the leaf is shown in FIG. 23A.

(2) [Results]

As a result, it was confirmed that when the PHBH was adhered to the leaves, the incidence of powdery mildew was as low as 1/3 or less of that of the control test (FIG. 22).

Experimental Example 14

Effect of PHA-Mixed Soil on Controlling Crown Gall

The following test was performed to examine whether or not PHA-mixed soil had the effect of suppressing crown gall. Crown gall is a soil-borne disease, and *Rhizobium radiobacter* (belonging to the same taxonomic group as Gram-negative bacteria) that is a crown gall pathogen forms galls on the roots and basal parts of woody plants including fruit trees and herbaceous plants to cause growth inhibition and death.

(1) [Disease Suppression Test]

A mixture of 11 L of soil collected from a grape field in Grape and Persimmon Research Division of NARO Institute of Fruit Tree Science and 1 L of the PHBH (PHBH-mixed soil) was placed in a pot (diameter: 30 cm), and was allowed to stand in a glass room for about 1.5 months.

A cell suspension was prepared as a source of inoculum by suspending the cells of a crown gall pathogen (one strain) cultured on a medium in sterile distilled water at $5 \times 10^9$ cfu/mL, and 950 mL of the cell suspension was poured on the surface of the soil. The soil was allowed to stand in the glass room for 1 week.

Ten apple rootstock (*Malus prunifolia* var. ringo) sticks (length: about 30 cm) were prepared, and the surface of each of the sticks was scratched with a knife in three places. The sticks were planted in the PHBH-mixed soil contained in the pot (about 10 cm of each of the sticks was inserted into the soil), and were then allowed to stand in the open air for about half a year.

A control test was performed in the following manner. A soil-containing pot was prepared in the same manner as described above except that farm soil collected from the field in Grape and Persimmon Research Division of NARO Institute of Fruit Tree Science was used without mixing with the PHBH (soil not mixed with the PHBH) instead of the PHBH-mixed soil, the cell suspension as a source of inoculum was poured into the soil, and apple rootstock sticks were planted in the PHBH-mixed soil contained in the pot and allowed to stand in the open air for about half a year.

The sticks were dug out of the soil, and the maximum diameters of galls formed on each of the sticks were measured, and the number of galls formed on each of the sticks was counted (the maximum number of galls is 3 because galls are formed on cuts). The results are shown in FIG. 24.

(2) [Results]

Figure 24:
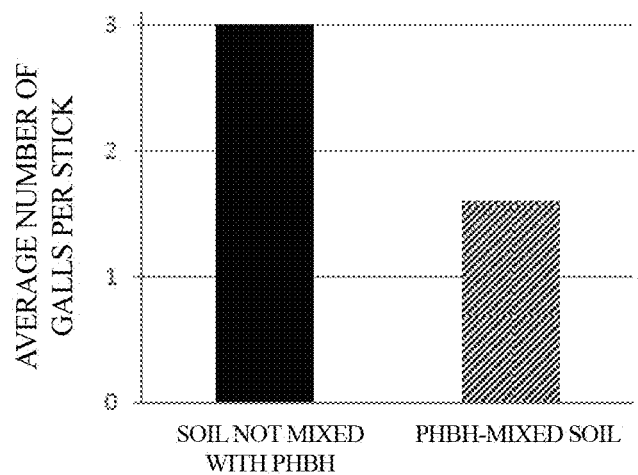
FIG. 24 is a graph showing the average number of galls per stick planted in PHBH-mixed soil and the average number of galls per stick planted in soil not mixed with PHBH in Experimental Example 14.
Figure 25A:
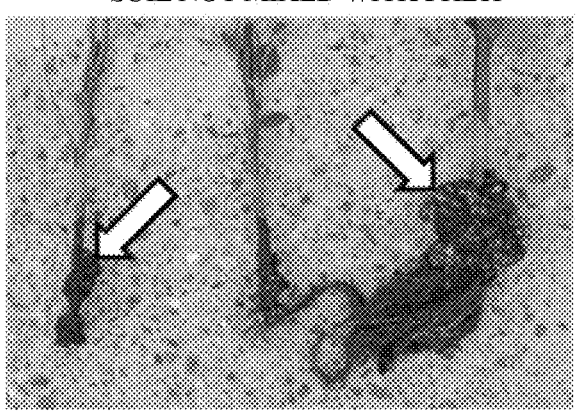
FIG. 25A and FIG. 25B are photographs showing the degree of crown gall in Experimental Example 14.
Figure 25B:
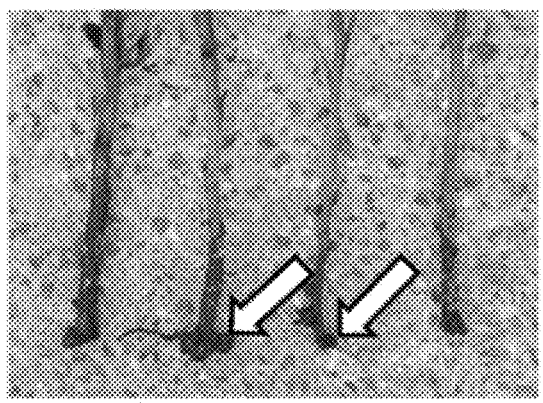

As a result, it was confirmed that when the PHBH-mixed soil was used, the number of galls formed due to crown gall was as low as about 1/2 of that of the control test (FIG. 24). Further, when the PHBH-mixed soil was used, the size of galls formed due to crown gall (average maximum diameter: 1.3 cm) was smaller than that of the control test (average maximum diameter: 2.8 cm) (FIG. 25).

The invention claimed is:

1. A method for controlling a soil-borne disease, the method comprising:

applying at least one polyhydroxyalkanoic acid having a structure of the formula (1) to soil containing at least one microorganism capable of decomposing the at least one polyhydroxyalkanoic acid and having antagonism against a pathogen that causes the soil-borne disease:

$$[-\text{CHR}-\text{CH}_2-\text{CO}-\text{O}-] \tag{1},$$

wherein R is an alkyl group represented by $C_nH_{2n+1}$ and n is an integer of from 1 to 15; and growing the at least one microorganism in the soil to which the polyhydroxyalkanoic acid is applied, wherein the soil-borne disease is at least one selected from the group consisting of white root rot caused by a white root rot fungus, *Armillaria* root rot caused by *Armillaria mellea*, violet root rot caused by *Helicobasidium mompa*, *Phytophthora* disease caused by *Phytophthora cactorum*, and crown gall caused by *Rhizobium radiobacter*, and wherein the at least one microorganism capable of decomposing the at least one polyhydroxyalkanoic acid and having antagonism against a pathogen that causes the soil-borne disease belongs to the genera of *Trichoderma, Glomus, Penicillium, Beauveria, Clonostachys, Sordaria, Bacillus, Pseudomonas, Streptomyces, Chaetomium,* or *Rhizobium*.

2. The method according to claim 1, wherein a volume of the at least one polyhydroxyalkanoic acid applied to the soil is 1% or more of a total volume of the at least one polyhydroxyalkanoic acid and the soil.

3. The method according to claim 1, wherein the applying is performed by mixing the at least one polyhydroxyalkanoic acid and the soil.

4. The method according to claim 1, wherein the soil-borne disease is white root rot caused by a white root rot fungus.

5. The method according to claim 1, wherein the at least one polyhydroxyalkanoic acid comprises poly(3-hydroxybutyric acid-co-3-hydroxyhexanoic acid).

6. The method according to claim 1, wherein the at least one polyhydroxyalkanoic acid has a 3-hydroxybutyric acid monomer content of 60 mol % or more.

7. The method according to claim 1, wherein the at least one polyhydroxyalkanoic acid has a weight-average molecular weight of 3,000 or more.

8. The method according to claim 1, wherein the at least one polyhydroxyalkanoic acid has a weight-average molecular weight of 400,000 or more.

9. The method according to claim 1, wherein the at least one polyhydroxyalkanoic acid is in the form of an emulsion or slurry, and has an average particle diameter of 0.1 µm to 100 µm.

10. The method according to claim 1, wherein the at least one polyhydroxyalkanoic acid is in the form of a powder or a sphere, and has an average particle diameter of 1 µm to 10 mm.

11. The method according to claim 3, wherein a mixture of the at least one polyhydroxyalkanoic acid and the soil is left for at least one week at a temperature of 10 to 30° C. such that the at least one microorganism in the soil grows in the mixture.

12. The method according to claim 1, wherein an amount of the at least one polyhydroxyalkanoic acid applied to the soil is from 1 to 60 parts by volume per 100 parts by volume of soil.

13. The method according to claim 1, wherein the growing is performed such that the at least one microorganism is proliferated in the soil.

14. The method according to claim 1, wherein the at least one microorganism is a microorganism that originally lives in the soil.

15. The method according to claim 2, wherein the applying is performed by mixing the at least one polyhydroxyalkanoic acid and the soil.

16. The method according to claim 2, wherein the soil-borne disease is white root rot caused by a white root rot fungus.

17. The method according to claim 2, wherein the at least one polyhydroxyalkanoic acid comprises poly(3-hydroxybutyric acid-co-3-hydroxyhexanoic acid).

18. The method according to claim 2, wherein the at least one polyhydroxyalkanoic acid has a 3-hydroxybutyric acid monomer content of 60 mol % or more.

\* \* \* \* \*